United States Patent
Shinkai et al.

(10) Patent No.: US 9,250,468 B2
(45) Date of Patent: Feb. 2, 2016

(54) DISPLAY PANEL AND DISPLAY UNIT

(75) Inventors: Shogo Shinkai, Miyagi (JP); Kentaro Okuyama, Miyagi (JP); Tomoaki Suzuki, Miyagi (JP); Akira Ebisui, Miyagi (JP); Yuji Takahashi, Miyagi (JP); Taizo Nishimura, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/522,893

(22) PCT Filed: Oct. 17, 2011

(86) PCT No.: PCT/JP2011/073835
§ 371 (c)(1),
(2), (4) Date: Aug. 2, 2012

(87) PCT Pub. No.: WO2012/053479
PCT Pub. Date: Apr. 26, 2012

(65) Prior Publication Data
US 2013/0229595 A1    Sep. 5, 2013

(30) Foreign Application Priority Data
Oct. 19, 2010   (JP) ............................... P2010-234413

(51) Int. Cl.
G02F 1/1333 (2006.01)
G02F 1/1343 (2006.01)
(Continued)

(52) U.S. Cl.
CPC ........ *G02F 1/133524* (2013.01); *G02F 1/1334* (2013.01); *G02F 1/134336* (2013.01); *G02F 1/134363* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,434,690 A * | 7/1995 | Hisatake et al. | 349/8 |
| 6,429,914 B1 * | 8/2002 | Kubota et al. | 349/86 |
| 6,497,928 B1 * | 12/2002 | Sato et al. | 428/1.1 |

(Continued)

FOREIGN PATENT DOCUMENTS

| | | |
|---|---|---|
| CN | 101498872 | 8/2009 |
| JP | 10-026765 | 1/1998 |

(Continued)

OTHER PUBLICATIONS

Chinese Office Action issued Jun. 24, 2014 in corresponding Chinese Patent Application No. 2011800067862.

(Continued)

*Primary Examiner* — Mark Teets
(74) *Attorney, Agent, or Firm* — K&L Gates LLP

(57) ABSTRACT

A display panel and a display unit are provided that allow a high-contrast and a bright image to be obtained. A display panel is composed of a light modulation device. The light modulation device includes: an electrode capable of generating a main electric field in a direction parallel to a plane intersecting with a normal line of a transparent substrate; and a light modulation layer including a bulk and a particulate each having an optical anisotropy. Optical axes AX1 and AX2 of the bulk and the particulate are parallel or substantially parallel to a top surface of the transparent substrate, and may be faced in different directions from each other and may be faced in same or substantially same directions with each other within the plane parallel or substantially parallel to the top surface of the transparent substrate depending on a magnitude of the electric field generated by the electrode.

8 Claims, 13 Drawing Sheets

(51) Int. Cl.
*G02F 1/1335* (2006.01)
*G02F 1/1334* (2006.01)

(52) U.S. Cl.
CPC .............. *G02F 2001/13345* (2013.01); *G02F 2001/13347* (2013.01); *G02F 2001/134381* (2013.01)

(56) References Cited

U.S. PATENT DOCUMENTS

| | | | |
|---|---|---|---|
| 6,630,969 B2 * | 10/2003 | Kubota et al. | 349/89 |
| 6,661,484 B1 | 12/2003 | Iwai et al. | |
| 6,690,447 B1 * | 2/2004 | Stephenson et al. | 349/187 |
| 6,791,658 B2 * | 9/2004 | Maruyama et al. | 349/183 |
| 6,836,314 B2 * | 12/2004 | Date et al. | 349/201 |
| 7,667,808 B2 * | 2/2010 | Yamashita | G02F 1/134363 349/139 |
| 2002/0093605 A1 | 7/2002 | Stephenson | |
| 2010/0085510 A1 * | 4/2010 | Okuyama et al. | 349/65 |
| 2010/0128189 A1 * | 5/2010 | Teranishi | G02F 1/1323 349/33 |

FOREIGN PATENT DOCUMENTS

| | | |
|---|---|---|
| JP | 11-237619 | 8/1999 |
| JP | 3204260 | 9/2001 |
| JP | 2008-065129 | 3/2008 |
| JP | 2009-181066 | 8/2009 |
| JP | 2009-223099 | 10/2009 |
| JP | 2010-157475 | 7/2010 |
| TW | 466364 | 12/2001 |

OTHER PUBLICATIONS

Japanese Office Action issued Jul. 17, 2014 in corresponding Japanese Patent Application No. 2010234413.

* cited by examiner

DISPLAY PANEL AND DISPLAY UNIT

CROSS REFERENCES TO RELATED APPLICATIONS

The present application is a national stage of International Application No. PCT/JP2011/073835 filed on Oct. 17, 2011 and claims priority to Japanese Patent Application No. 2010-234413 filed on Oct. 19, 2010, the disclosure of which is incorporated herein by reference.

BACKGROUND

The present invention is related to a display panel and a display unit that include a light modulation device exhibiting the scattering property or transparency to light.

In recent years, the demand for a display unit in use for mobile devices such as cellular phone and electronic paper has increased, and a reflection-type display unit has drawn attention. The reflection-type display unit carries out a display by reflecting incident light from the outside using a reflecting plate, eliminating the need for a backlight. Therefore, electric power consumed by a backlight is saved, which makes it possible to drive mobile devices for a longer period of time as compared with a case of using a transmission-type display unit. Further, disuse of a backlight allows weight saving and miniaturization accordingly.

For the reflection-type display unit, however, it is not easy to enhance the contrast, and thus various methods have been proposed in the past. For example, Patent Document 1 proposes to mount a retardation plate between a substrate and a polarization plate that hold a liquid crystal layer in between when a liquid crystal panel is used for a display panel.

PRIOR ART DOCUMENT

Patent Document

Patent Document 1: Japanese Patent Registration No. 3204260

SUMMARY

Meanwhile, as a display panel for the reflection-type display unit, in addition to the above-described liquid crystal panel, it is possible to use a panel utilizing a PDLC (Polymer Dispersed Liquid Crystal). The PDLC is a device capable of switching the transparency and scattering by applying a voltage, and is configured to include liquid crystal molecules with relatively fast response speed to an electric field generated by an electrode and polymer molecules with relatively slow response speed to an electric field generated by an electrode.

However, when a general-type PDLC is viewed from a direction intersecting with a normal line of such a PDLC (that is, from an oblique direction), refractive indexes of the liquid crystal molecules and the polymer molecules are not consistent with each other. Therefore, use of such a general-type PDLC in a display panel for the reflection-type display unit has a disadvantage of increased black luminance and decreased contrast. In particular, when characters, pictures, and the like are displayed, these are partially put into scattering and transparent (or black) status, and light scattered in this scattering portion is guided to upper and lower substrates, reaching even a transparent (or black) portion. As a result, in the event of low transparency (low black level), the black luminance is further increased and the contrast is decreased. In addition, when a horizontal alignment-type PDLC is used in a display panel for the reflection-type display unit, if an electrode is arranged to apply an electric field in a vertical direction, it is only possible to reflect one of polarized components of light incoming onto the top surface of the PDLC. This causes a disadvantage in that it is not easy to obtain a bright image.

The present invention has been made in view of such disadvantages, and it is an object of the present invention to provide a display panel and a display unit that allow a high-contrast and bright image to be obtained.

A display panel of the present invention includes a light modulation device. The light modulation device includes: a first transparent substrate and a second transparent substrate that are disposed in opposition to one another via a spacing; an electrode provided on a top surface of at least one transparent substrate of the first transparent substrate and the second transparent substrate; and a light modulation layer provided in the spacing between the first transparent substrate and the second transparent substrate. The electrode is capable of generating a main electric field in a direction parallel to a first plane intersecting with a normal line of the first transparent substrate. The light modulation layer is configured to include a first region and a second region each having an optical anisotropy. An optical axis of the first region and an optical axis of the second region in the light modulation layer are parallel to the first plane intersecting with the normal line of the first transparent substrate, and are faced in different directions from each other and are faced in same or substantially same directions with each other within the first plane depending on a magnitude of the electric field generated by the electrode.

A display unit of the present invention includes a display panel and a driving circuit that drives the display panel. The display panel included in this display unit is identical to the above-described display panel in configuration.

In the display panel and the display unit of the present invention, the optical axes of the first region and the second region in the light modulation layer are parallel to the first plane intersecting with the normal line of the first transparent substrate, and may be faced in the different directions from each other, or the same or substantially the same directions with each other within the first plane depending on the magnitude of the electric field generated by the electrode. Consequently, when the optical axes of the first region and the second region are faced in the same or substantially the same directions with each other, the light modulation layer has a uniform refractive index distribution in every direction, exhibiting the transparency to outside light. When the light modulation layer exhibits the transparency, therefore, outside light incoming onto the display panel is transmitted through the light modulation layer, and, for example, is absorbed by a housing or a light-absorbing member at a rear side of the display panel. As a result, it is possible to reduce the black luminance. Further, when the optical axes of the first region and the second region are faced in the different directions from each other, the light modulation layer exhibits the scattering property to both polarized components contained in outside light incoming onto the display panel obliquely, as well as exhibiting the scattering property to both polarized components contained in outside light incoming onto the display panel vertically. Accordingly, when the light modulation layer exhibits the scattering property, it is possible to reflect both polarized components contained in outside light incoming onto the display panel.

In the display panel and the display unit of the present invention, it is also possible to provide a light source at a side surface of a light guide plate. Further, in the display panel and the display unit of the present invention, the first plane may be parallel or substantially parallel to the top surface of the first transparent substrate, or may not be parallel to the top surface of the first transparent substrate. In the display panel and the display unit of the present invention, when the light source is provided at the side surface of the light guide plate, it is preferable that the first plane be not parallel to the top surface of the first transparent substrate. When the first plane is parallel or substantially parallel to the top surface of the first transparent substrate, the electrode is, for example, configured in the following manner. That is, the electrode includes a plurality of first electrodes provided on the first transparent substrate, and a plurality of second electrodes provided on the second transparent substrate. Each of the first electrodes extends in a direction parallel to the top surface of the first transparent substrate, and each of the second electrodes extends in the same direction as the extending direction of the first electrodes and disposed alternately with each of the first electrodes.

When the first plane is not parallel to the top surface of the first transparent substrate, for example, it is possible to adopt any one of three kinds of structures given below for the electrode. In a first example, the electrode includes a plurality of first electrodes provided on the first transparent substrate, and a plurality of second electrodes provided on the second transparent substrate. In this example, each of the first electrodes extends in a direction parallel to the top surface of the first transparent substrate, and each of the second electrodes extends in the same direction as the extending direction of the first electrodes and disposed at a position that is not in opposition to the first electrodes. In a second example, the electrode includes a plurality of first electrodes provided on the first transparent substrate, and a plurality of second electrodes provided on the second transparent substrate. In this example, each of the first electrodes extends in a direction parallel to the top surface of the first transparent substrate, and each of the second electrodes extends in a direction intersecting with the extending direction of the first electrodes. In a third example, the electrode includes a plurality of first electrodes and a plurality of second electrodes that are provided on the first transparent substrate, as well as a plurality of third electrodes provided on the second transparent substrate. In this example, each of the first electrodes extends in a direction parallel to the top surface of the first transparent substrate, and each of the second electrodes extends in the same direction as the extending direction of the first electrodes and disposed alternately with each of the first electrodes. Further, each of the third electrodes extends in a direction intersecting with the extending direction of the first electrodes.

According to the display panel and the display unit of the present invention, it is possible to reduce the black luminance when the light modulation layer exhibits the transparency, while it is possible to reflect both polarized components contained in outside light incoming onto the display panel when the light modulation layer exhibits the scattering property, which allows a high-contrast and bright image to be obtained.

Further, in the display panel and the display unit of the present invention, when the light source is provided at the side surface of the light guide plate and the first plane is not parallel to the top surface of the first transparent substrate, it is possible to effectively scatter both of outside light incoming from an upper surface and light from the light source that is incoming from a lateral direction on the light modulation layer, which allows a brighter image to be obtained.

Additional features and advantages are described herein, and will be apparent from the following Detailed Description and the figures.

DETAILED DESCRIPTION

Figure 1:
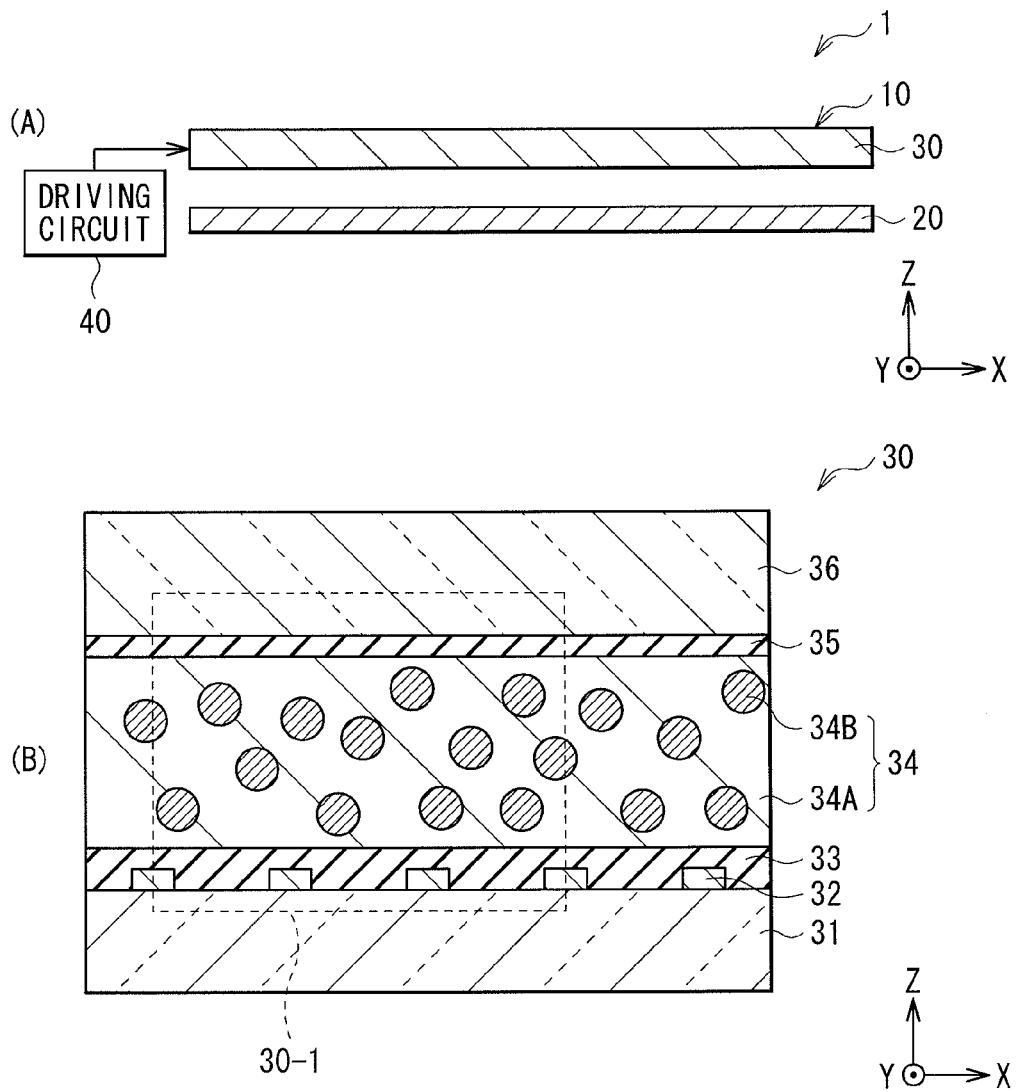
FIG. 1 is a cross-sectional diagram showing an example for configuration of a backlight according to an embodiment of the present invention.

Hereinafter, the embodiments of the present invention are described in details with reference to the drawings. It is to be noted that the descriptions are provided in the order given below.
1. Embodiments
  Example where IPS (In-Plane Switching) type PDLC is used for display panel (FIG. 1 to FIG. 10)
  Configuration of vertical alignment-type PDLC according to comparative example (FIG. 11 to FIG. 13)
2. Modification examples
  Example where light guide plate and side-light are provided (FIG. 14)
  Another example of electrode arrangement for IPS-type PDLC (FIG. 15)
  Variations of electrode structure (FIG. 16 to FIG. 18)
  Example where color filter is provided (FIG. 19)

1. Embodiments

FIG. 1(A) is a cross-sectional diagram showing an example for simplified configuration of a display unit 1 according to an embodiment of the present invention. FIG. 1(B) is a cross-sectional diagram showing an example for configuration of a light modulation device 30 that constitutes a part of the display unit 1 illustrated in FIG. 1(A). It is to be noted that FIGS. 1(A) and (B) are schematic pattern diagrams which do not necessarily show the same dimensions and shapes as actual ones. The display unit 1 includes, for example, a display panel 10, a light-absorbing plate 20 disposed at the rear side of the display panel 10, and a driving circuit 40 to drive the display panel 10. The display panel 10 has, for example, the light modulation device 30.

Figure 2:
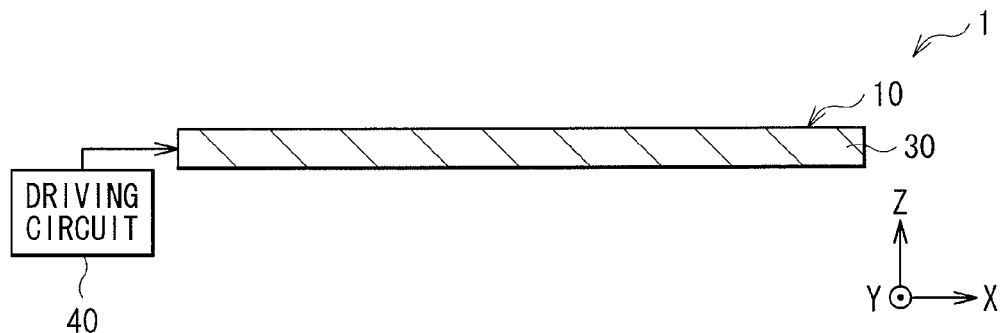
FIG. 2 is a cross-sectional diagram showing a modification example for configuration of the backlight illustrated in FIG. 1.

The light-absorbing plate 20, which absorbs light leaking out of the rear side of the display panel 10, is, for example, composed of a resin with a black pigment dispersed thereon. It is to be noted that omission of the light-absorbing plate 20 is also allowed as shown in FIG. 2 for example when a housing (not shown in the figure) of the display unit 1 has the light-absorbing property.

On the light modulation device 30, as shown in FIG. 1(B) for example, a transparent substrate 31, an electrode 32, an alignment film 33, a light modulation layer 34, an alignment film 35, and a transparent substrate 36 are arranged in this order from the light-absorbing plate 20 side.

The transparent substrates 31 and 36, which support the light modulation layer 34, are typically composed of substrates transparent to visible light, such as glass plates and plastic films. The electrode 32 is provided at the top surface of the light modulation layer 34 side on the transparent substrate 31. The electrode 32 has a structure capable of generating a main electric field in a direction parallel to a plane intersecting with a normal line of the transparent substrate 31, and in this embodiment, has a structure capable of generating a main electric field in a direction parallel to the top surface of the transparent substrate 31 within the light modulation layer 34. It is to be noted that a plane intersecting with a normal line of the transparent substrate 31 corresponds to a specific example of a "first plane" in the present invention.

Figure 3:
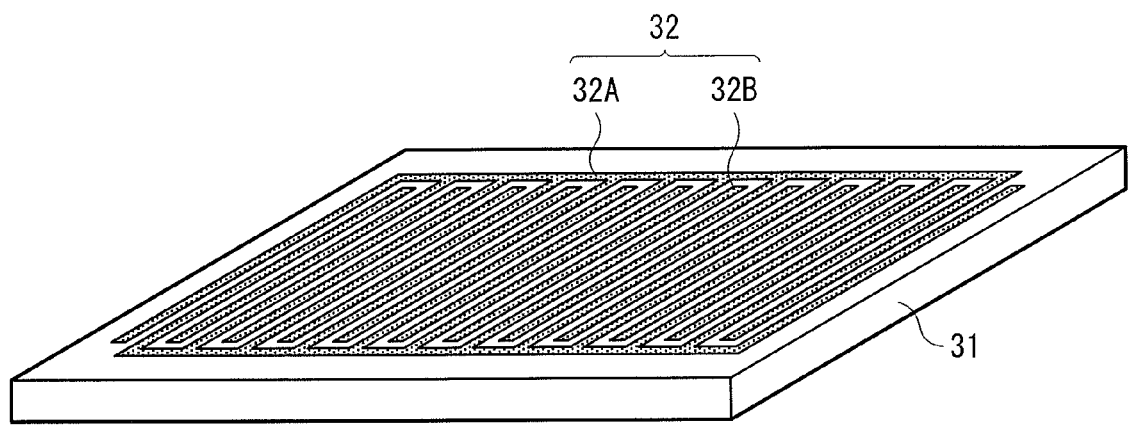
FIG. 3 is a perspective diagram showing an example for configuration of an electrode illustrated in FIG. 1.
Figure 4:
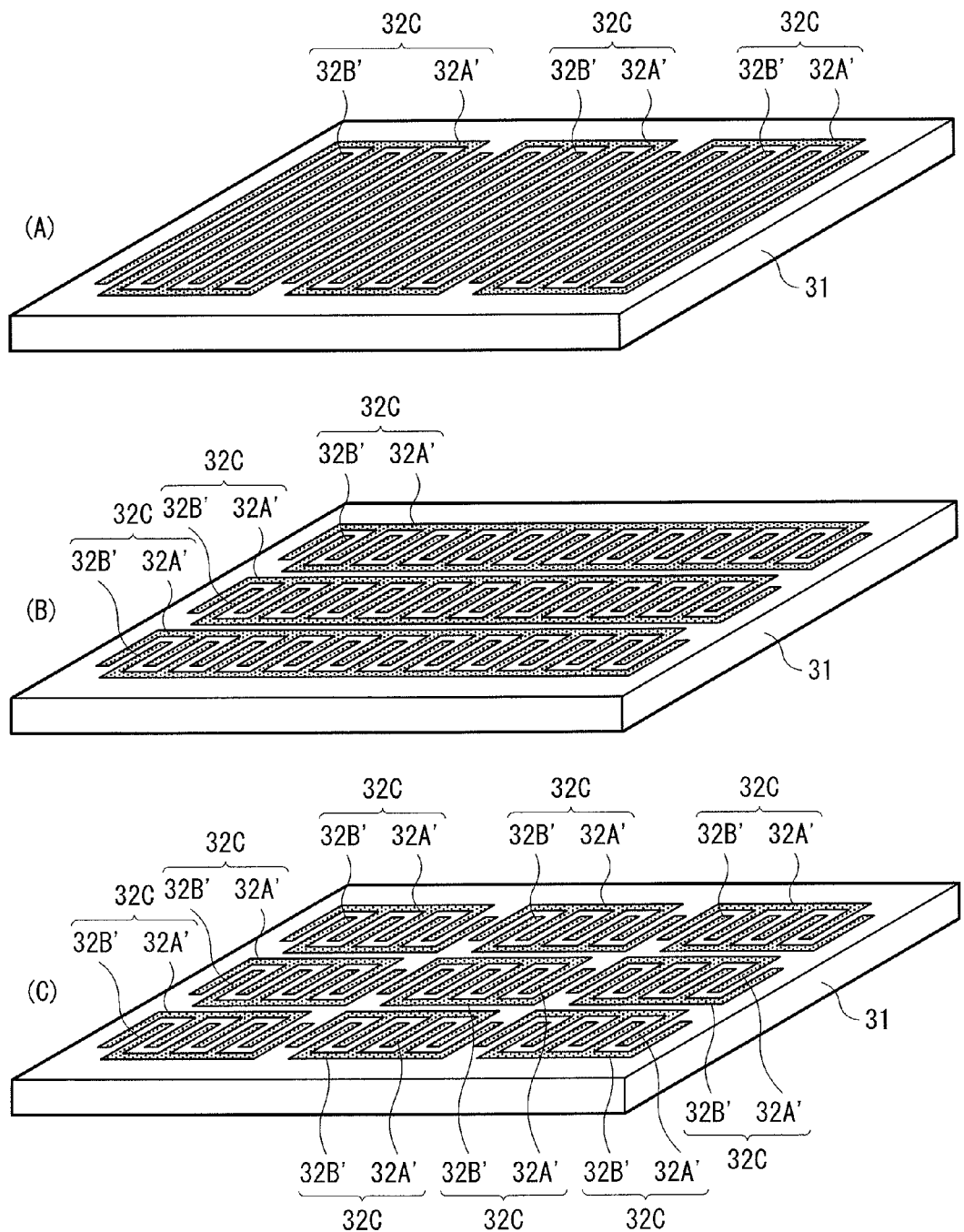
FIG. 4 is a perspective diagram showing another example for configuration of the electrode illustrated in FIG. 1.

In concrete terms, for example, as shown in FIG. 3 by extracting a part of the light modulation device 30, the electrode 32 includes: a first electrode 32A having one or more strip-shaped electrodes extending toward one in-plane direction parallel to the top surface of the transparent substrate 31; and a second electrode 32B having one or more strip-shaped electrodes that are disposed alternately with the strip-shaped electrodes on the first electrode 32A. The strip-shaped electrodes on the first electrode 32A and the strip-shaped electrodes on the second electrode 32B are, for example, parallel to each other, or almost parallel to each other. When a plurality of strip-shaped electrodes are included in the first electrode 32A, the strip-shaped electrodes are electrically connected with each other. Similarly, when a plurality of strip-shaped electrodes are included in the second electrode 32B, the strip-shaped electrodes are electrically connected with each other. When a predetermined voltage is applied to the first electrode 32A and the second electrode 32B, these electrodes generate a main electric field in a direction parallel to the top surface of the transparent substrate 31 and a direction orthogonal to the extending direction of the strip-shaped electrodes on the first electrode 32A.

Each of the first electrode 32A and the second electrode 32B may be composed of a single structure as shown in FIG. 3 for example, or may be composed of a plurality of structures. For example, as shown in FIGS. 4(A) to (C), the first electrode 32A may be composed of a plurality of partial electrodes 32A', and the second electrode 32B may be composed of a plurality of partial electrodes 32B'. In this case, each of the partial electrodes 32A' has one or more strip-shaped electrodes extending toward one in-plane direction parallel to the top surface of the transparent substrate 31. On the other hand, each of the partial electrodes 32B' has one or more strip-shaped electrodes that are disposed alternately with one or more strip-shaped electrodes included in the partial electrodes 32A'. One or more strip-shaped electrodes included in the partial electrodes 32A' and one or more strip-shaped electrodes included in the partial electrodes 32B' are, for example, parallel to each other, or almost parallel to each other. When a plurality of strip-shaped electrodes are included in each of the partial electrodes 32A', the strip-shaped electrodes are electrically connected with each other. Similarly, when a plurality of strip-shaped electrodes are included in each of the partial electrodes 32A', the strip-shaped electrodes are electrically connected with each other. When a predetermined voltage is applied to the partial electrodes 32A' and the partial electrodes 32B', these electrodes generate a main electric field in a direction parallel to the top surface of the transparent substrate 31 and a direction orthogonal to the extending direction of the strip-shaped electrodes on the partial electrodes 32A'. It is to be noted that the partial electrodes 32A' and 32B' which are engaged with each other are hereinafter referred to as a partial electrode pair 32C.

For example, as shown in FIGS. 4(A) and (B), a plurality of the partial electrode pairs 32C may be arrayed in one in-plane direction, or may be arrayed in a matrix pattern as shown in FIG. 4(C). It is to be noted that when a plurality of the partial electrode pairs 32C are arrayed in a matrix pattern, a single partial electrode pair 32C corresponds to a single pixel on the display unit 1.

The electrode 32 is composed of, for example, a transparent conductive material such as Indium Tin Oxide (ITO). Aside from a transparent material, however, the electrode 32 may be alternatively composed of, for example, a conductive material with the light-absorbing property. Examples of the conductive material with the light-absorbing property include chrome and a conductive material with a black pigment dispersed thereon. It is to be noted that when the electrode 32 is composed of a conductive material with the light-absorbing property, the electrode 32 also has a capability to absorb light that is transmitted through the light modulation layer. In this case, therefore, it is also possible to omit the light-absorbing plate 20 as shown in FIG. 2 for example.

When the first electrode 32A and the second electrode 32B are composed of a plurality of the partial electrodes 32A' and 32B' respectively, and the partial electrode pair 32C is viewed from a normal line direction of the light modulation device 30, a location in opposition to the partial electrode pair 32C on the light modulation device 30 constitutes a light modulation cell 30-1. A location illustrated with a dotted line in FIG. 1(B) as an example becomes the light modulation cell 30-1. Each light modulation cell 30-1 is allowed to be driven independently of the rest of the light modulation cells 30-1 by applying a predetermined voltage to the partial electrodes 32A' and 32B', and exhibits the transparency or the scattering property to outside light incoming from the top surface of the display panel 10 depending on a magnitude of a value of the voltage applied to the partial electrodes 32A' and 32B'. It is to be noted that the transparency and the scattering property are detailed in describing the light modulation layer 34.

The alignment films 33 and 35 align liquid crystal and monomer in use for the light modulation layer 34. In this embodiment, a horizontal alignment film is used for the alignment films 33 and 35. Examples of the horizontal alignment film include an alignment film formed by performing a rubbing treatment of polyimide, polyamide-imide, polyvinyl alcohol, and the like, and an alignment film in a groove shape given by transcription or etching. Further, other examples of the horizontal alignment film also include an alignment film formed by performing oblique vapor deposition of an inorganic material such as silicon oxide, a diamond-like carbon alignment film formed by irradiating an ion beam, and an alignment film with an electrode pattern slit formed thereon. When plastic films are used for the transparent substrates 31 and 36, it is preferable that calcination temperature after application of the alignment films 33 and 35 on the top surfaces of the transparent substrates 31 and 36 in a manufacturing process be as low as possible. Therefore, it is preferable to use polyamide-imide that is allowed to be formed at temperature of 100 degrees C. or less for the alignment films 33 and 35.

Further, for the horizontal alignment film, it is sufficient to provide only a capability to align liquid crystal and monomer, and, for example, the reliability based on repeated application of voltage that is demanded for a general-type liquid crystal display is not necessary. This is because the reliability for application of voltage after fabrication of a device is determined by an interface between polymerized monomer and liquid crystal. Additionally, instead of using the alignment films, for example, by applying an electric field or a magnetic field between the first electrode 32A and the second electrode 32B (or between the partial electrodes 32A' and 32B'), it is also possible to align the liquid crystal and monomer in use for the light modulation layer 34. In other words, by irradiating ultraviolet rays while applying an electric field or a magnetic field between the first electrode 32A and the second electrode 32B (or between the partial electrodes 32A' and 32B'), it is possible to fix an alignment state of the liquid crystal and monomer with a voltage applied thereon. When a voltage is used to form the alignment film, it is possible to form a separate electrode for alignment and driving, or to use dual-frequency liquid crystal that inverts a sign of dielectric anisotropy depending on a frequency for a liquid crystal material. Further, when a magnetic field is used to form the alignment film, it is preferable to use a material with high anisotropy of magnetic susceptibility for the alignment film, and thus it is preferable to use a material with many benzene rings for example.

The light modulation layer 34 exhibits the scattering property or the transparency for outside light incoming from the top surface of the display panel 10 depending on a magnitude of an electric field. As shown in FIG. 1(B) for example, the light modulation layer 34 is a composite layer including a bulk 34A and a plurality of particulates 34B in a form of particles dispersed within the bulk 34A. The bulk 34A and the particulates 34B have the optical anisotropy. Optical axes of the bulk 34A and the particulates 34B (AX1 and AX2 to be hereinafter described) are parallel to a plane intersecting with a normal line of the transparent substrate 31, and may be faced toward different directions from each other, or the same or almost the same directions with each other within a plane intersecting with a normal line of the transparent substrate 31 depending on a magnitude of an electric field generated by the electrode 32.

Figure 5:
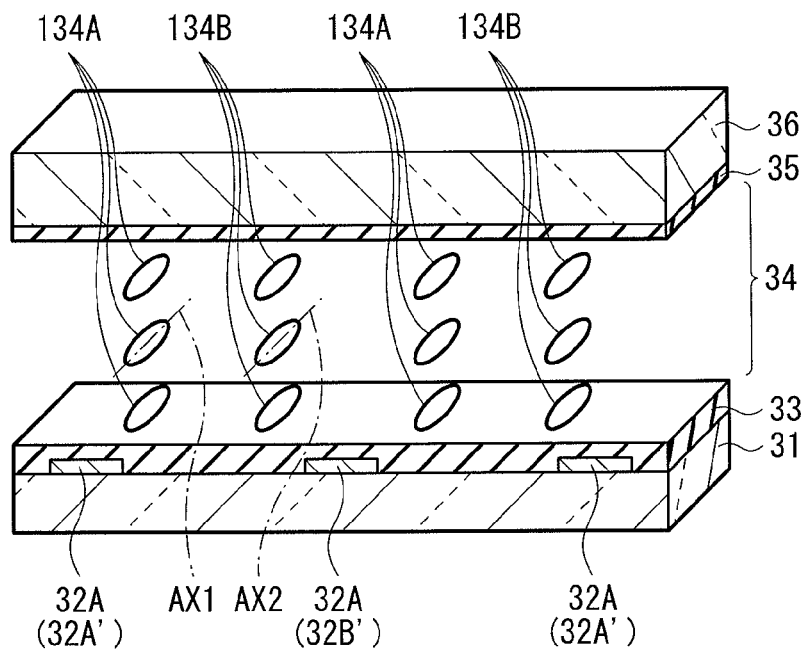
FIG. 5 is a schematic diagram for explaining an example for alignment of a light modulation layer illustrated in FIG. 1.

FIG. 5 shows an example of an alignment state within the bulk 34A and the particulates 34B when no voltage is applied between the first electrode 32A and the second electrode 32B (or between the partial electrodes 32A' and 32B') as a schematic diagram. An ellipsoid 134A in FIG. 5 represents an example of a refractive index ellipsoid indicating the refractive index anisotropy of the bulk 34A when no voltage is applied between the first electrode 32A and the second electrode 32B (or between the partial electrodes 32A' and 32B'). An ellipsoid 134B in FIG. 5 represents an example of a refractive index ellipsoid indicating the refractive index anisotropy of the particulates 34B when no voltage is applied between the first electrode 32A and the second electrode 32B (or between the partial electrodes 32A' and 32B'). These refractive index ellipsoids, which represent the refractive index of linear polarized light incoming from various directions using tensor ellipsoids, allow the refractive index to be geometrically found by seeing the cross-sectional surfaces of the ellipsoids from a light incoming direction.

Figure 6:
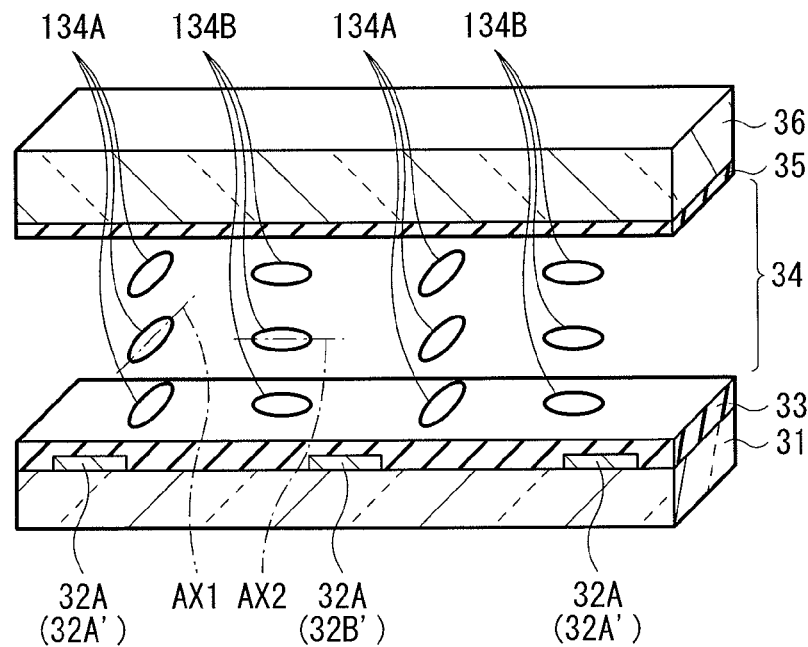
FIG. 6 is a schematic diagram for explaining another example for alignment of the light modulation layer illustrated in FIG. 1.
Figure 7:
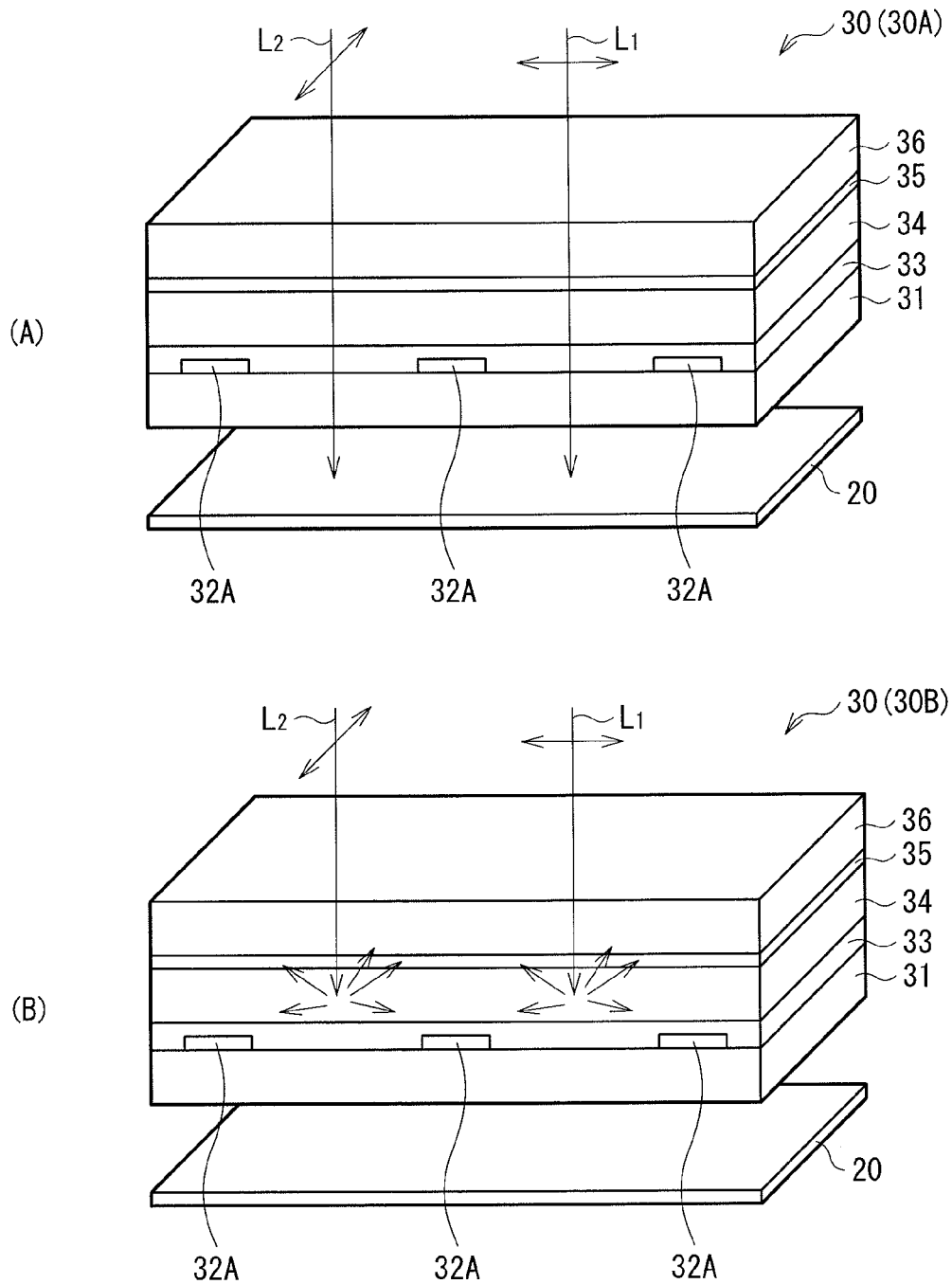
FIG. 7 is a schematic diagram for explaining an operation of the backlight illustrated in FIG. 1.
Figure 8:
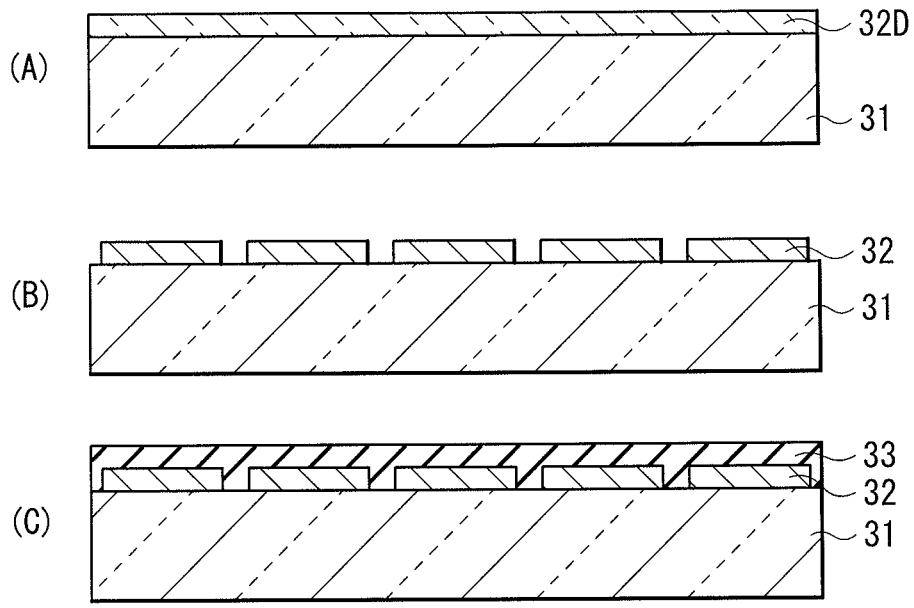
FIG. 8 is a cross-sectional diagram for explaining a manufacturing process of the backlight illustrated in FIG. 1.
Figure 9:
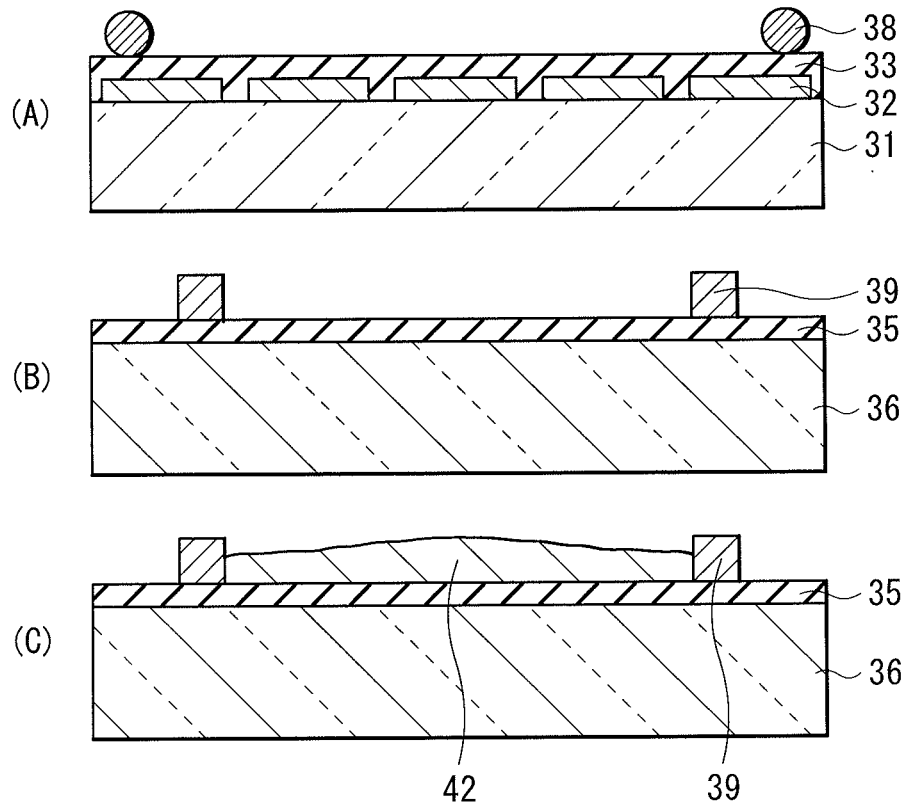
FIG. 9 is a cross-sectional diagram for explaining a manufacturing process following FIG. 8.
Figure 10:
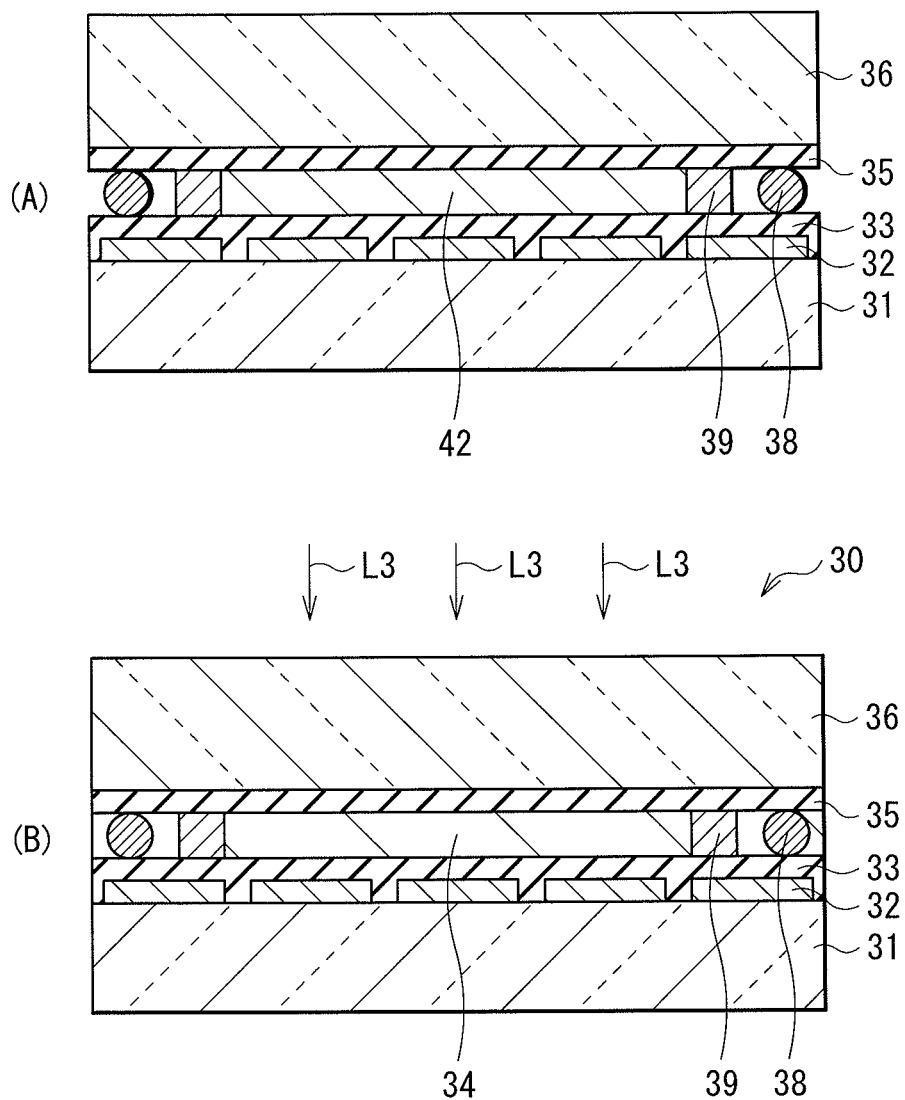
FIG. 10 is a cross-sectional diagram for explaining a manufacturing process following FIG. 9.

FIG. 6 shows an example of an alignment state within the bulk 34A and the particulates 34B when a voltage is applied between the first electrode 32A and the second electrode 32B (or between the partial electrodes 32A' and 32B') as a schematic diagram. An ellipsoid 134A in FIG. 6 represents an example of a refractive index ellipsoid indicating the refractive index anisotropy of the bulk 34A when a voltage is applied between the first electrode 32A and the second electrode 32B (or between the partial electrodes 32A' and 32B'). An ellipsoid 134B in FIG. 6 represents an example of a refractive index ellipsoid indicating the refractive index anisotropy of the particulates 34B when a voltage is applied between the first electrode 32A and the second electrode 32B (or between the partial electrodes 32A' and 32B').

As shown in FIG. 5 for example, the bulk 34A and the particulates 34B are configured in such a manner that the optical axis AX1 of the bulk 34A (for example, long axis of the ellipsoid 134A) and the optical axis AX2 of the particulates 34B (for example, long axis of the ellipsoid 134B) are matched to one another in direction thereof (for example, parallel to one another) when no voltage is applied between the first electrode 32A and the second electrode 32B (or between the partial electrodes 32A' and 32B'). It is to be noted that the optical axes AX1 and AX2 indicate a line parallel to a traveling direction of a light beam where the refractive index becomes a single value regardless of a polarizing direction. Further, when no voltage is applied between the first electrode 32A and the second electrode 32B (or between the partial electrodes 32A' and 32B'), it is not necessary that the optical axes AX1 and AX2 are matched to one another in direction thereof at any time, and the direction of the optical axis AX1 and that of the optical axis AX2 may be shifted in some degree due to manufacturing error for example.

Further, when no voltage is applied between the first electrode 32A and the second electrode 32B (or between the partial electrodes 32A' and 32B'), the optical axis AX2 is parallel or almost parallel to the top surface of the transparent substrate 31, and is parallel to the extending direction of the strip-shaped electrodes included in the first electrode 32A and the second electrode 32B (or the partial electrodes 32A' and 32B').

Meanwhile, irrespective of whether or not a voltage is applied between the first electrode 32A and the second electrode 32B (or between the partial electrodes 32A' and 32B'), the bulk 34A is configured in such a manner that a direction of the optical axis AX1 is fixed. In concrete terms, the optical axis AX1 is parallel or almost parallel to the top surface of the transparent substrate 31, and is parallel to the extending direction of the strip-shaped electrodes included in the first electrode 32A and the second electrode 32B (or the partial electrodes 32A' and 32B'). That is, when no voltage is applied between the first electrode 32A and the second electrode 32B

(or between the partial electrodes 32A' and 32B'), the optical axis AX1 is parallel or almost parallel to the optical axis AX2.

It is to be noted that the optical axis AX2 does not have to be parallel to the top surface of the transparent substrate 31 at any time, and may be faced toward a direction intersecting with the top surface of the transparent substrate 31 at a small angle due to manufacturing error for example.

Here, it is preferable that ordinary light refractive indexes of the bulk 34A and the particulates 34B be equal to each other, and extraordinary light refractive indexes of the bulk 34A and the particulates 34B be equal to each other. In this case, for example, when no voltage is applied between the first electrode 32A and the second electrode 32B (or between the partial electrodes 32A' and 32B'), there is very few refractive index difference in every direction including front direction and oblique direction, resulting in high transparency being achieved. Consequently, for example, outside light incoming from the top surface of the display panel 10 is transmitted through the light modulation layer 34 without being scattered within the light modulation layer 34 regardless of polarizing direction. In other words, both of an ordinary light component L1 and an extraordinary light component L2 that are included in the outside light incoming from the top surface of the display panel 10 are transmitted through a region that becomes transparent within the light modulation device 30 (transmission region 30A) (FIG. 7(A)). As a result, the outside light incoming from the top surface of the display panel 10 (ordinary light component L1 and extraordinary light component L2) is absorbed by the light-absorbing plate 20, thereby reducing the luminance of the transmission region 30A (black display luminance).

Further, for example, when a voltage is applied between the first electrode 32A and the second electrode 32B (or between the partial electrodes 32A' and 32B'), the bulk 34A and the particulates 34B are configured in such a manner that directions of the optical axis AX1 and the optical axis AX2 are different from one another (for example, intersecting or orthogonal) as shown in FIG. 6. Additionally, for example, when a voltage is applied between the first electrode 32A and the second electrode 32B (or between the partial electrodes 32A' and 32B'), the particulates 34B are configured in such a manner that the optical axis AX2 is parallel to the top surface of the transparent substrate 31, while being intersecting with (or orthogonal to) the extending direction of the strip-shaped electrodes included in the first electrode 32A and the second electrode 32B (or the partial electrodes 32A' and 32B').

Therefore, when a voltage is applied between the first electrode 32A and the second electrode 32B (or between the partial electrodes 32A' and 32B'), a refractive index difference increases in every direction within a plane parallel to the top surface of the transparent substrate 31, resulting in high scattering property being achieved. Consequently, for example, outside light incoming from the top surface of the display panel 10 is scattered or reflected within the light modulation layer 34 regardless of polarizing direction. In other words, both of the ordinary light component L1 and the extraordinary light component L2 that are included in the outside light incoming from the top surface of the display panel 10 are scattered or reflected at a region that is put into a scattering state within the light modulation device 30 (scattering region 30B) (FIG. 7(B)). As a result, the outside light incoming from the top surface of the display panel 10 (ordinary light component L1 and extraordinary light component L2) is scattered or reflected within the light modulation device 30, and the resultant light is emitted to the outside from the top surface of the display panel 10, thereby increasing the luminance of the scattering region 30B (white display luminance). FIG. 7(B) shows a case where outside light is incident from a normal line direction of the transparent substrate 36, although the same scattering as shown in FIG. 7(B) is achieved as well when outside light inclined from a normal line is incident. Further, when the scattering region 30B and the transmission region 30A are located adjacently with one another, light scattered at the scattering region 30B is guided to the transmission region 30A via the transparent substrates 31 and 36. However, because the transparency of the transmission region 30A is high as described above, no scattering light is generated at the transmission region 30A, which increases the contrast.

It is to be noted that ordinary light refractive indexes of the bulk 34A and the particulates 34B may be shifted in some degree due to manufacturing error for example, and are preferably 0.1 or less, being more preferably 0.05 or less. Additionally, for extraordinary light refractive indexes of the bulk 34A and the particulates 34B as well, they may be shifted in some degree due to manufacturing error for example, and are preferably 0.1 or less, being more preferably 0.05 or less.

Further, for a refractive index difference (=extraordinary light refractive index−ordinary light refractive index) of the bulk 34A and a refractive index difference (=extraordinary light refractive index−ordinary light refractive index) of the particulates 34B, they are preferably as great as possible. That is, they are preferably 0.05 or more, and are more preferably 0.1 or more, being further more preferably 0.15 or more. When the refractive index differences in the bulk 34A and the particulates 34B are great, a scattering power of the light modulation layer 34 becomes high, which allows the contrast to be further enhanced.

Further, for the bulk 34A and the particulates 34B, response speeds to an electric field are different from each other. For example, the bulk 34A has a stripe-shaped structure or a porous structure that does not respond to an electric field, or has a rod-like structure with the response speed slower than that of the particulates 34B. The bulk 34A is formed of, for example, a polymeric material obtained by polymerizing low-molecular-weight monomer. For example, the bulk 34A is formed by polymerizing a material (for example, monomer) having the alignment property or polymerization property that is aligned along an alignment direction of the particulates 34B or a rubbing direction of the alignment films 33 and 35 using one or more of heat and light.

On the other hand, the particulates 34B are composed to mainly contain a liquid crystal material for example, having the response speed sufficiently faster than that of the bulk 34A. An example of a liquid crystal material (for example, liquid crystal molecules) contained in the particulates 34B includes rod-like molecules. As the liquid crystal molecules contained in the particulates 34B, it is preferable to use a material having the positive dielectric anisotropy (so-called positive-type liquid crystal).

In such a case, when no voltage is applied between the first electrode 32A and the second electrode 32B (or between the partial electrodes 32A' and 32B'), a long axis direction of the liquid crystal molecules within the particulates 34B is parallel to the optical axis AX1. At this time, a long axis of the liquid crystal molecules within the particulates 34B is parallel to the top surface of the transparent substrate 31, and is faced toward the extending direction of the strip-shaped electrodes included in the first electrode 32A and the second electrode 32B (or the partial electrodes 32A' and 32B'). Further, when a voltage is applied between the first electrode 32A and the second electrode 32B (or between the partial electrodes 32A' and 32B'), a long axis direction of the liquid crystal molecules within the particulates 34B is intersecting with (or orthogonal to) the optical axis AX1. At this time, a long axis of the liquid crystal molecules within the particulates 34B is parallel to the top surface of the transparent substrate 31, and is intersecting with (or orthogonal to) the extending direction of the strip-shaped electrodes included in the first electrode 32A and the second electrode 32B (or the partial electrodes 32A' and 32B'). In this case, when the alignment films 33 and 35 are horizontal alignment films, a pre-tilt in which the optical axis rises from the top surface at several degrees occurs in the liquid crystal molecules. Depending on alignment film materials to be used, the pre-tilt is in the order ranging from 0.1 to 10 degrees. In this case as well, however, high transparency and scattering property as described above are achieved in the light modulation layer 34.

As the above-described monomer having the alignment property and polymerization property, any material having the optical anisotropy and being composite with a liquid crystal may be used, although such a material is preferably a low-molecular-weight monomer that is cured with ultraviolet light in this embodiment. Because it is preferable that directions of the optical anisotropy in the liquid crystal and a material (for example, polymeric material) that is formed by polymerizing the low-molecular-weight monomer be matched to each other in a state where no voltage is applied, it is preferable that the liquid crystal and the low-molecular-weight monomer be aligned toward the same direction prior to the ultraviolet curing. When a liquid crystal is used for the particulates 34B, if the liquid crystal is composed of rod-like molecules, it is preferable that a monomer material to be used has a rod-like shape as well. Therefore, as a monomer material, it is preferable to use a material combining the polymerization property with the liquid crystalline property. For example, as a polymerizable functional group, it is preferable to have at least one functional group selected from a group including acrylate group, methacrylate group, acryloyloxy group, methacryloyloxy group, vinyl ether group, and epoxy group. These functional groups are allowed to be polymerized by irradiating ultraviolet light, infrared light, or electron beam, or by heating. To suppress deterioration in a degree of alignment during irradiation of ultraviolet light, it is also possible to add a liquid crystalline material with a poly-functional group. When the above-described stripe-shaped structure is employed for the bulk 34A, it is preferable to use a bi-functional liquid crystalline monomer as a raw material for the bulk 34A. Further, to a raw material for the bulk 34A, a mono-functional monomer is allowed to be added for adjustment of temperature exhibiting the liquid crystalline property, or three- or more functional monomer is allowed to be added for improvement of a crosslink density.

The driving circuit 40 applies a predetermined voltage to the first electrode 32A and the second electrode 32B (or the partial electrodes 32A' and 32B'). For example, the driving circuit 40 is configured to allow an image to be displayed on the display panel 10 by applying a voltage based on an image signal incoming from the outside to the partial electrodes 32A' and 32B'. For example, the driving circuit 40 is configured to control a magnitude of a voltage to be applied to the partial electrodes 32A' and 32B' on the basis of an image signal so that the optical axis AX2 of the particulates 34B is parallel or almost parallel to the optical axis AX1 of the bulks 34A in one light modulation cell 30-1, while the optical axis AX2 of the particulates 34B is intersecting with or orthogonal to the optical axis AX1 of the bulks 34A in the other light modulation cell 30-1. In other words, the driving circuit 40 makes directions of the optical axes AX1 and AX2 of the bulks 34A and the particulates 34B identical (or almost identical) to each other, or different from each other (or orthogonal to each other) under control of an electric field based on the image signal, thereby allowing an image to be displayed on the display panel 10.

Hereinafter, a manufacturing method for the display panel 10 according to this embodiment is described with reference to the figures from FIGS. 8(A) to (C) to FIGS. 10(A) and (B).

First, a transparent conductive film 32D such as ITO is formed on the transparent substrate 31 formed of a glass substrate or a plastic film substrate (FIG. 8(A)). Subsequently, a patterned resist layer (not shown in the figure) is formed on the transparent conductive film 32D, and then the transparent conductive film 32D is selectively etched using the resist layer as a mask. As a result, the electrode 32 is formed (FIG. 8(B)).

Next, the alignment film 33 is coated over a whole area of the top surface, being followed by drying and calcination (FIG. 8(C)). When a polyimide-based material is used for the alignment film 33, NMP (N-Methyl-2-Pyrrolidone) is often used for a solvent, although temperature of approximately 200 degrees C. is necessary under atmosphere at this time. It is to be noted that when a plastic substrate is used for the transparent substrate 31 in this case, vacuum drying and calcination of the alignment film 33 at temperature of 100 degrees C. are also allowed. Thereafter, a rubbing treatment is performed for the alignment film 33. This enables the alignment film 33 to function as an alignment film for horizontal alignment.

Subsequently, a spacer 38 for forming a cell gap on the alignment film 33 is dispersed in a dry or wet process (FIG. 9(A)). It is to be noted that when the light modulation cell 30-1 is fabricated using a vacuum bonding method, the spacer 38 may be mixed in a mixture to be dropped in advance. Alternatively, it is also possible to form a pillar spacer using a photolithographic method instead of the spacer 38.

Thereafter, on the alignment film 35 that is fabricated in the same manner as the above, a seal adhesive pattern 39 for bonding and preventing liquid crystal leakage is coated in a frame-shaped pattern (FIG. 9(B)). The seal adhesive pattern 39 is allowed to be formed using a dispenser method or a screen printing method.

Hereinafter, the vacuum bonding method (One Drop Fill method; ODF method) is described, although it is also possible to fabricate the light modulation cell 30-1 using a vacuum-pressure impregnation method or a roll bonding method.

First, a mixture 42 of the liquid crystal and monomer that corresponds to a cubic volume content determined by a cell gap, a cell area, and the like is dropped in a plane uniformly (FIG. 9(C)). It is preferable to use a precision-dispenser of a linear guide type for dropping of the mixture 42, although a die coater or the like may be utilized by the use of the seal adhesive pattern 39 as a bank.

For the liquid crystal and monomer, it is possible to use the above-described material, although a weight ratio of the liquid crystal to the monomer is in a range from 98:2 to 50:50, and is preferably in a range from 95:5 to 75:25, being more preferably in a range from 92:8 to 85:15. It is possible to lower a driving voltage by increasing a ratio of the liquid crystal. If a ratio of the liquid crystal is increased too much, however, it is likely that a whiteness degree is deteriorated when a voltage is applied, or response speed is reduced after a voltage is turned off, which makes it difficult to return to a transparent state.

For the mixture 42, a polymerization initiator is added apart from the liquid crystal and monomer. Depending on an ultraviolet wavelength to be used, a monomer ratio of a polymerization initiator to be added is adjusted within a range of a weight percentage from 0.1 to 10. In addition, it is possible to add polymerization inhibitor, plasticizer, viscosity modifier, and the like to the mixture 42 if necessary. When the monomer is in a solid or gel state at room temperature, it is preferable to heat a cap, syringe, or substrate.

After the transparent substrate 31 and the transparent substrate 36 are placed on a vacuum bonding machine (not shown in the figure), vacuum evacuation followed by bonding is carried out (FIG. 10(A)). Subsequently, a bonded resultant is exposed to the atmospheric air to uniform the cell gap by applying a uniform pressure under the atmospheric pressure. It is possible to select the cell gap appropriately on the basis of a relation between the white luminance (whiteness degree) and driving voltage, although the cell gap is in a range from 5 to 40 µm, and is preferably in a range from 6 to 20 µm, being more preferably in a range from 7 to 10 µm.

After bonding, it is preferable to carry out an alignment treatment as may be necessary (not shown in the figure). In the event that any light leakage occurs when bonded cells are inserted between cross-nicol polarizers, the alignment is performed in such a manner that the cells are heated for a given period of time, or are left as they are at room temperature. Thereafter, polymerization is carried out in a manner of irradiating ultraviolet light L3 to polymerize the monomer (FIG. 10(B)). In such a method, the light modulation device 30 is manufactured.

In irradiating ultraviolet light, it is preferable to prevent any variation in cell temperature. Use of an infrared light cut filter, or an UV-LED and the like as a light source is preferable. Because the ultraviolet intensity has an influence on an organization structure of a composite material, it is preferable to adjust the ultraviolet intensity as appropriate from a liquid crystal material and a monomer material to be used, or composition thereof. The ultraviolet intensity is preferably in a range from 0.1 to 500 mW/cm$^2$, being more preferably in a range from 0.5 to 30 mW/cm$^2$. There is a trend that a driving voltage is decreased as the ultraviolet intensity becomes lower, and thus it is possible to select the desirable ultraviolet intensity in consideration of both aspects of the productivity and characteristics.

Finally, a lead wire (not shown in the figure) is attached to the electrode 32. In such a method described hitherto, the display panel 10 according to this embodiment may be manufactured.

Next, the description is provided on the operation and advantageous effects of the display unit 1 according to this embodiment.

In the display unit 1 according to this embodiment, for example, a voltage based on an image signal incoming from the outside is applied to the partial electrodes 32A' and 32B' for each light modulation cell 30-1. At this time, for example, a voltage is applied to the partial electrodes 32A' and 32B' on each light modulation cell 30-1 so that the optical axis AX2 of the particulates 34B is parallel or almost parallel to the optical axis AX1 of the bulks 34A in one light modulation cell 30-1, while the optical axis AX2 of the particulates 34B is intersecting with or orthogonal to the optical axis AX1 of the bulks 34A in the other light modulation cell 30-1. As a result, outside light incoming from the top surface of the display panel 10 is transmitted through the transmission region 30A where the optical axes AX1 and AX2 are parallel or almost parallel to one another on the light modulation device 30. This transmitted light is absorbed by the light-absorbing plate 20 provided at the rear side of the display panel 10. Further, the outside light incoming from the top surface of the display panel 10 is scattered or reflected at the scattering region 30B where the optical axes AX1 and AX2 are intersecting with or orthogonal to one another on the light modulation device 30. Among such scattered light and reflected light, the light transmitted through the undersurface of the scattering region 30B is reflected at the undersurface of the display panel 10, and is returned to the scattering region 30B once again, subsequently being emitted out of the top surface of the display unit 1. Further, among the scattered light and reflected light, the light moving toward the top surface of the scattering region 30B is emitted out of the top surface of the display unit 1 as it is. As described above, in this embodiment, light is hardly emitted out of the top surface of the transmission region 30A, and is emitted out of the top surface of the scattering region 30B. This increases a modulation ratio in the front direction.

Meanwhile, a general-type PDLC is configured to include liquid crystal molecules with relatively fast response speed to an electric field generated by an electrode and polymer molecules with relatively slow response speed to an electric field generated by an electrode. However, when a general-type PDLC is viewed from a direction intersecting with a normal line of such a PDLC (that is, from an oblique direction), refractive indexes of the liquid crystal molecules and the polymer molecules are not consistent with each other. Therefore, use of such a general-type PDLC in a display panel for the reflection-type display unit has a disadvantage of increased black luminance and decreased contrast. In particular, when characters, pictures, and the like are displayed, these are partially put into scattering and transparent (or black) status, and light scattered in this scattering portion is guided to upper and lower substrates, reaching even a transparent (or black) portion. As a result, in the event of low transparency (low black level), the black luminance is further increased and the contrast is decreased. In addition, when a horizontal alignment-type PDLC is used in a display panel for the reflection-type display unit, if an electrode is arranged to apply an electric field in a vertical direction, it is only possible to reflect one of polarized components of light incoming onto the top surface of the PDLC. This causes a disadvantage in that it is not easy to obtain a bright image.

Figure 11:
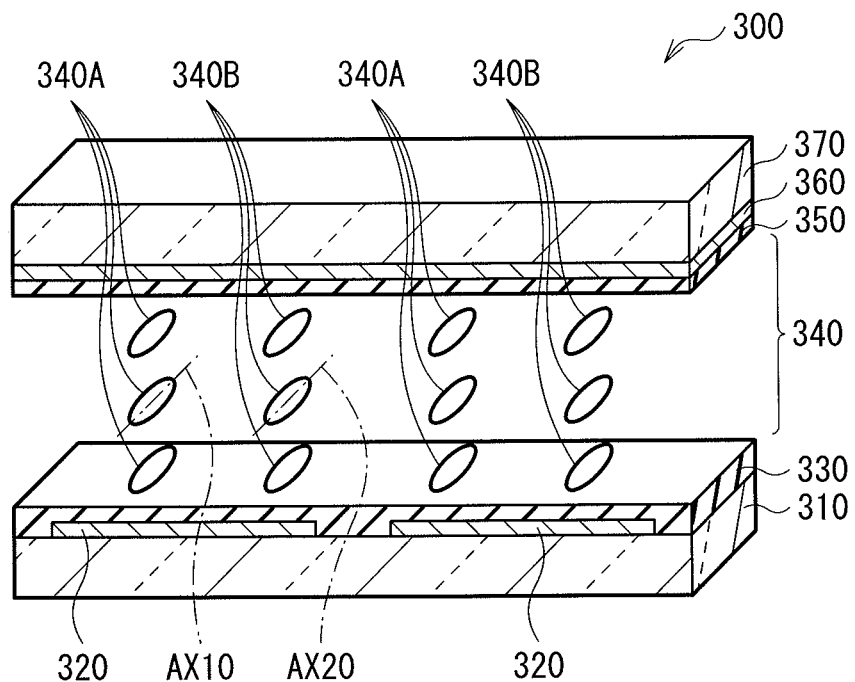
FIG. 11 is a schematic diagram for explaining an example for alignment of a vertical alignment-type PDLC.
Figure 12:
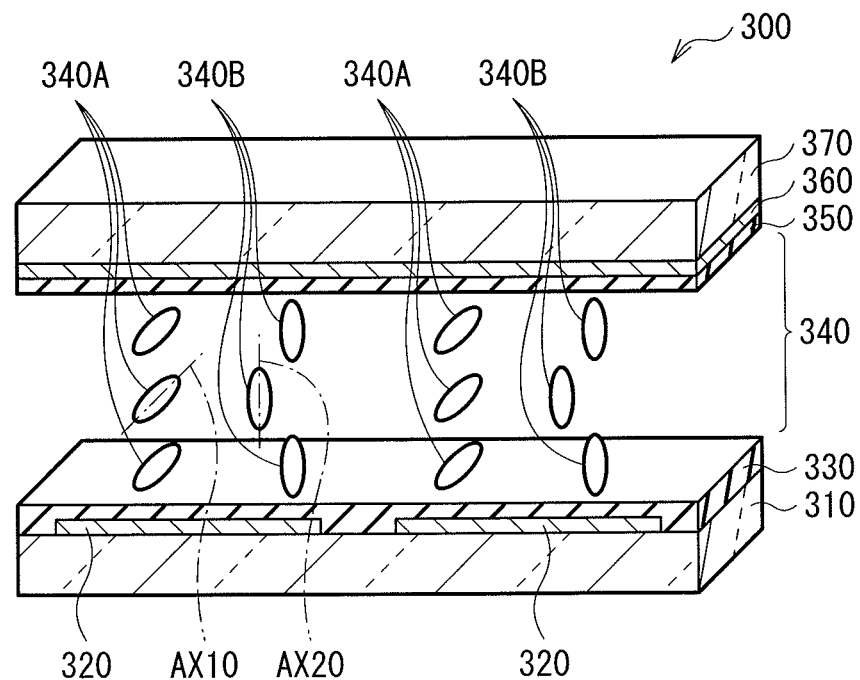
FIG. 12 is a schematic diagram for explaining another example for alignment of the vertical alignment-type PDLC.
Figure 13:
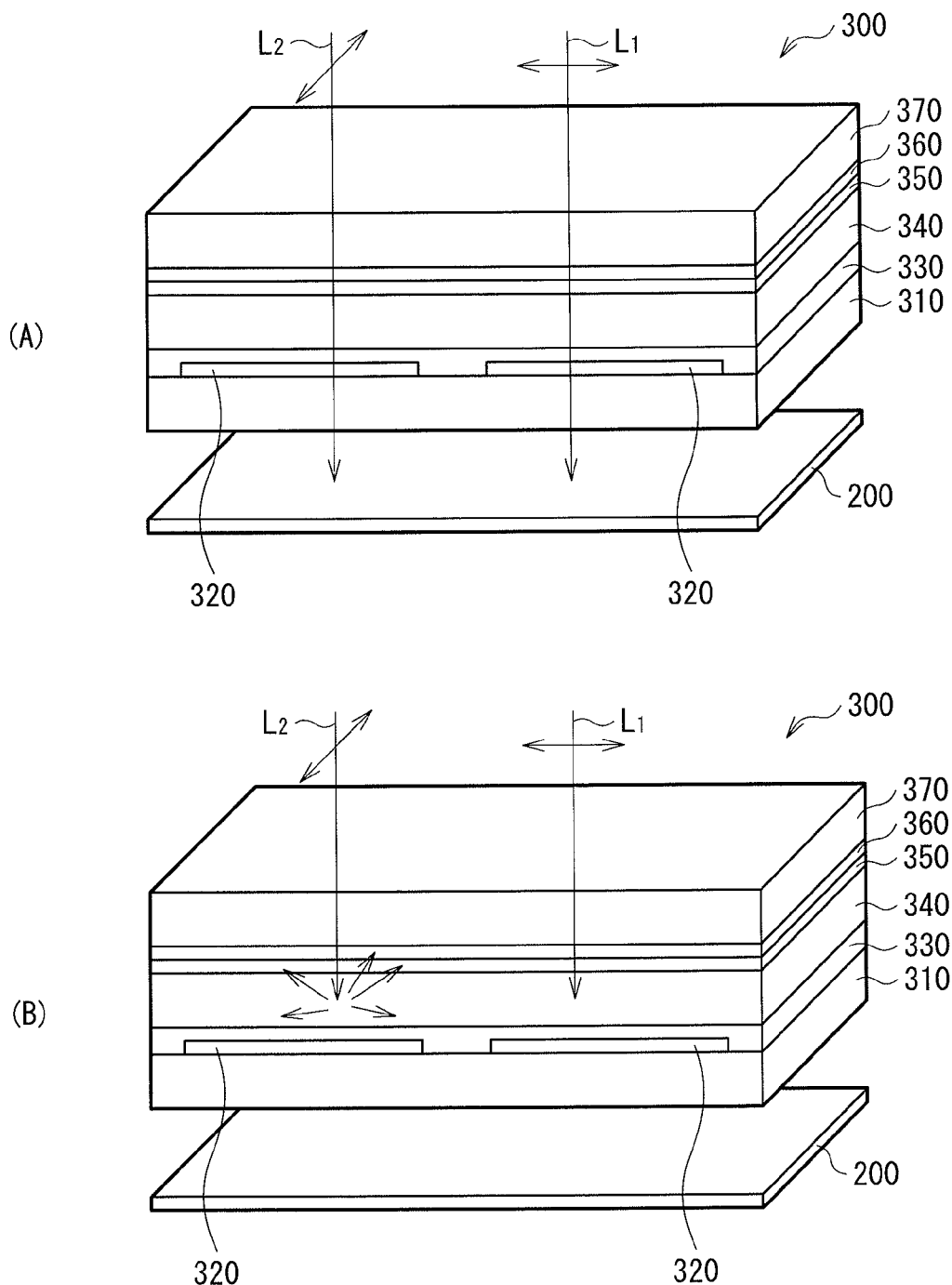
FIG. 13 is a schematic diagram for explaining an operation of the PDLC illustrated in FIG. 11 and FIG. 12.
Figure 14:
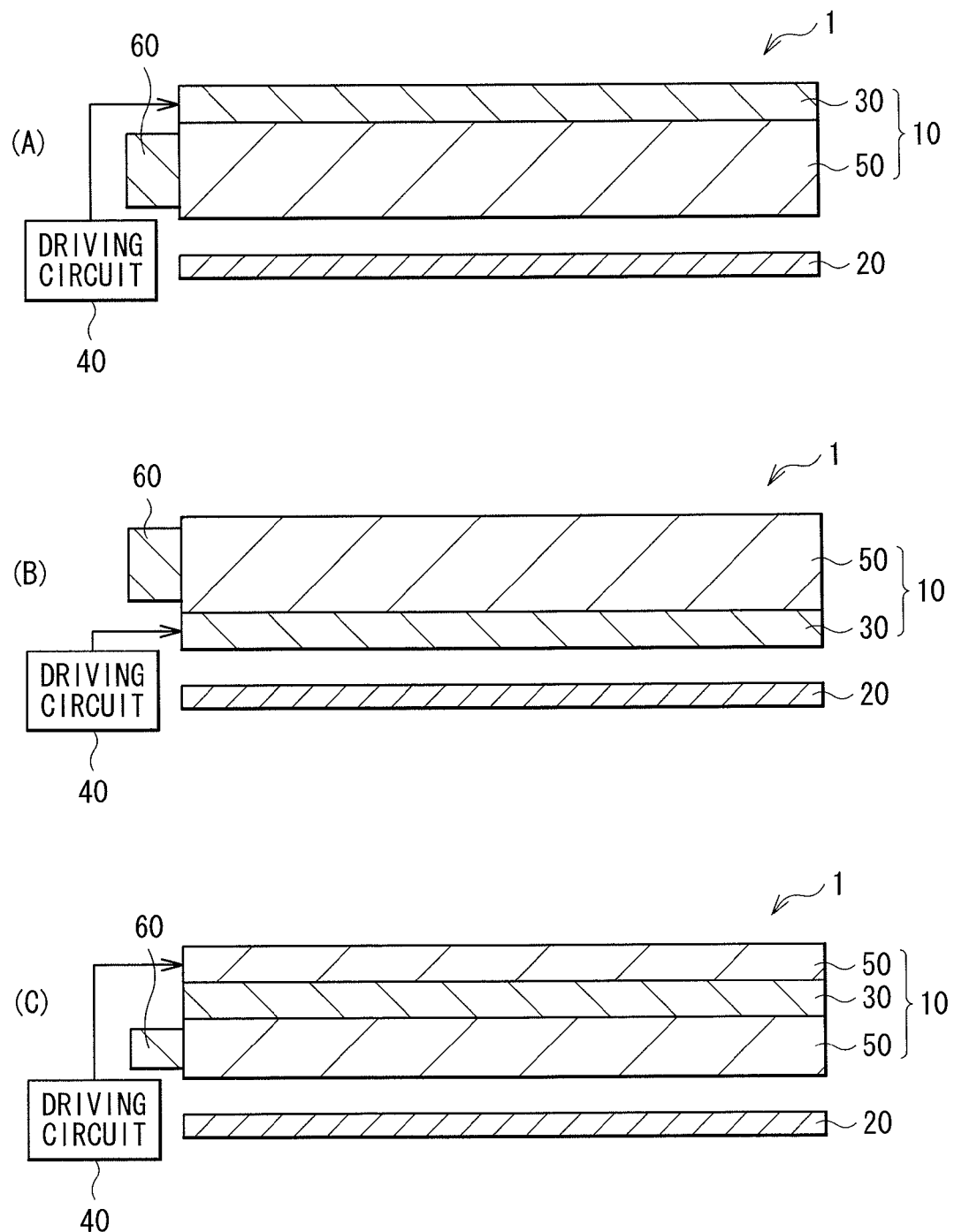
FIG. 14 is a cross-sectional diagram showing a modification example for configuration of the backlight illustrated in FIG. 1.

Hereinafter, the brief description is provided on a horizontal alignment-type PDLC in which an electrode is arranged to apply an electric field in a vertical direction. FIGS. 11 to 13 show a horizontal alignment-type PDLC in which an electrode is arranged to apply an electric field in a vertical direction (light modulation device 300) as schematic diagrams. On the light modulation device 300, as shown in FIG. 11 for example, a transparent substrate 310, a plurality of lower-side electrodes 320, an alignment film 330, a light modulation layer 340, an alignment film 350, a plurality of upper-side electrodes 360, and a transparent substrate 370 are laminated in this order. A plurality of the lower-side electrodes 320 extend in a predetermined direction, being disposed side by side with each other. A plurality of upper-side electrodes 360 extend to a direction intersecting with the lower-side electrodes 320, being disposed side by side with each other.

FIG. 11 shows an example of an alignment state within the light modulation layer 340 when no voltage is applied between the lower-side electrodes 320 and the upper-side electrodes 360 as a schematic diagram. An ellipsoid 340A in FIG. 11 represents an example of a refractive index ellipsoid indicating the refractive index anisotropy of polymer molecules when no voltage is applied between the lower-side electrodes 320 and the upper-side electrodes 360. An ellipsoid 340B in FIG. 11 represents an example of a refractive index ellipsoid indicating the refractive index anisotropy of liquid crystal molecules when no voltage is applied between the lower-side electrodes 320 and the upper-side electrodes 360.

FIG. 12 shows an example of an alignment state within the light modulation layer 340 when a voltage is applied between the lower-side electrodes 320 and the upper-side electrodes 360 as a schematic diagram. An ellipsoid 340A in FIG. 12 represents an example of a refractive index ellipsoid indicating the refractive index anisotropy of polymer molecules when a voltage is applied between the lower-side electrodes 320 and the upper-side electrodes 360. An ellipsoid 340B in FIG. 11 represents an example of a refractive index ellipsoid indicating the refractive index anisotropy of liquid crystal molecules when a voltage is applied between the lower-side electrodes 320 and the upper-side electrodes 360.

When no voltage is applied between the lower-side electrodes 320 and the upper-side electrodes 360, as shown in FIG. 11, directions of an optical axis AX10 of the polymer molecules and an optical axis AX20 of the liquid crystal molecules are consistent with each other, and are parallel to the top surface of the transparent substrate 310. On the other hand, when a voltage is applied between the lower-side electrodes 320 and the upper-side electrodes 360, as shown in FIG. 12, directions of the optical axis AX10 and the optical axis AX20 are different from each other, and only the optical axis AX20 is, due to applied voltage, parallel to a normal line of the top surface of the transparent substrate 310.

It is seen from FIG. 11 that when no voltage is applied between the lower-side electrodes 320 and the upper-side electrodes 360, there is hardly a refractive index difference found in every direction within the light modulation layer 340, thereby achieving high transparency. As shown in FIG. 13(A), therefore, both of the ordinary light component L1 and the extraordinary light component L2 that are included in the outside light incoming from the top surface of the display panel 10 are transmitted through the light modulation device 300, being absorbed by a light-absorbing plate 200 for example. On the other hand, it is seen from FIG. 12 that when a voltage is applied between the lower-side electrodes 320 and the upper-side electrodes 360, on the light modulation layer 340, a refractive index difference is increased in a direction parallel to the optical axis AX10, thereby achieving high scattering property, although there is hardly a refractive index difference found in a direction intersecting with the optical axis AX10 and the optical axis AX20, resulting in the scattering property being hardly achieved. As shown in FIG. 13(B), therefore, one (extraordinary light component L2 in the figure) of the ordinary light component L1 and the extraordinary light component L2 that are included in the outside light incoming from the top surface of the display panel 10 is only scattered or reflected within the light modulation device 300, while the other polarized light component (ordinary light component L1 in the figure) is transmitted through the light modulation device 300, being absorbed by the light-absorbing plate 200 for example. As described above, a vertical alignment-type PDLC allows only one of polarized components of light incoming onto the top surface of the PDLC to be reflected. This causes a disadvantage in that it is not easy to obtain a bright image.

On the other hand, in this embodiment, the optical axes AX1 and AX2 of the bulk 34A and the particulates 34B in the light modulation layer 34 are parallel or almost parallel to the top surface of the transparent substrate 31, and may be faced toward different directions from each other, or the same or almost the same directions with each other within a plane parallel or almost parallel to the top surface of the transparent substrate 31 depending on a magnitude of an electric field generated by the electrode 32. In other words, the light modulation device 30 according to this embodiment is a so-called IPS (In-Plane Switching) type PDLC. Therefore, when the optical axes AX1 and AX2 of the bulk 34A and the particulates 34B are faced toward different directions from each other, the light modulation layer 34 exhibits the scattering property for both polarized light components included in outside light incoming obliquely onto the display panel 10, and also exhibits the scattering property for both polarized light components included in outside light incoming vertically onto the display panel 10. Consequently, when the light modulation layer 34 exhibits the scattering property, it is possible to reflect both polarized light components included in outside light incoming vertically onto the display panel 10. As a result, this allows a bright image to be obtained.

Further, in this embodiment, when the optical axes AX1 and AX2 of the bulk 34A and the particulates 34B are faced toward the same or almost the same directions with each other, the light modulation layer 34 exhibits the transparency for both polarized light components included in outside light incoming obliquely onto the display panel 10, and also exhibits the transparency for both polarized light components included in outside light incoming vertically onto the display panel 10. Consequently, when the light modulation layer 34 exhibits the transparency, it is possible to transmit both polarized light components therethrough that are included in outside light incoming vertically onto the display panel 10, allowing the transmitted light to be absorbed by the light-absorbing plate 20 (or electrode 32 with light-absorbing property). As a result, this allows the high contrast to be obtained.

2. Modification Examples

First Modification Example

In the above-described embodiment, the display panel 10 is only composed of the light modulation device 30, although this may be alternatively configured to further include a light guide plate 50 and a light source 60 disposed at the side surface of the light guide plate 50 as shown in FIGS. 14(A) to (C). Here, FIG. 14(A) illustrates a view in which the light guide plate 50 is joined closely to the rear side (undersurface) of the light modulation device 30 with no air layer interposed between. FIG. 14(B) illustrates a view in which the light guide plate 50 is joined closely to the top surface of the light modulation device 30 with no air layer interposed between. FIG. 14(C) illustrates a view in which the light guide plate 50 is joined closely to both of the top surface and undersurface of the light modulation device 30 with no air layer interposed between.

The light guide plate 50 is configured to guide light incoming onto the side surface of the light guide plate 50 from the light source 60 to the top surface of the light guide plate 50. The light guide plate 50 takes, for example, a form of a cuboid surrounded by a top surface, an undersurface, and side surfaces. The light guide plate 50 has, for example, a shape in which a predetermined pattern is developed on at least one of the top surface and undersurface. The light guide plate 50 has a functionality to scatter and uniform the light that is incident from the top surface of the display panel 10 and is scattered within the light modulation device 30. The light guide plate 50 is composed mainly to include a transparent thermoplastic resin such as polycarbonate resin (PC) and acrylic resin (polymethyl methacrylate (PMMA)).

Figure 16:
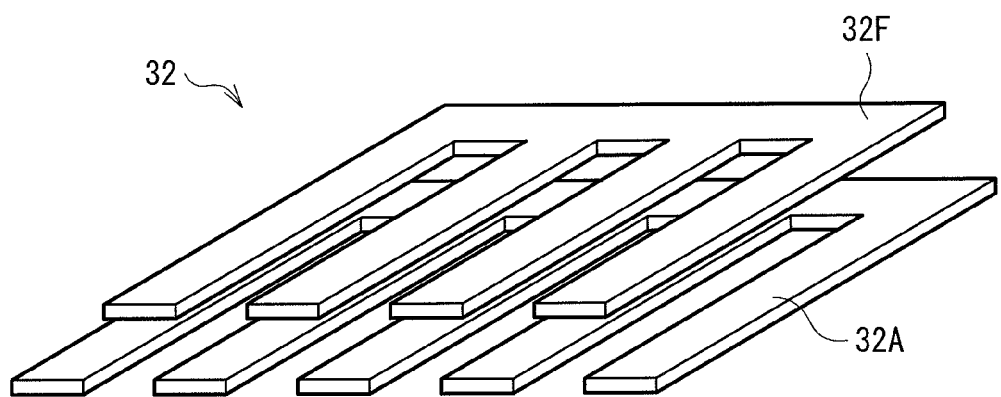
FIG. 16 is a perspective diagram showing a first modification example for configuration of the electrode illustrated in FIG. 1.
Figure 17:
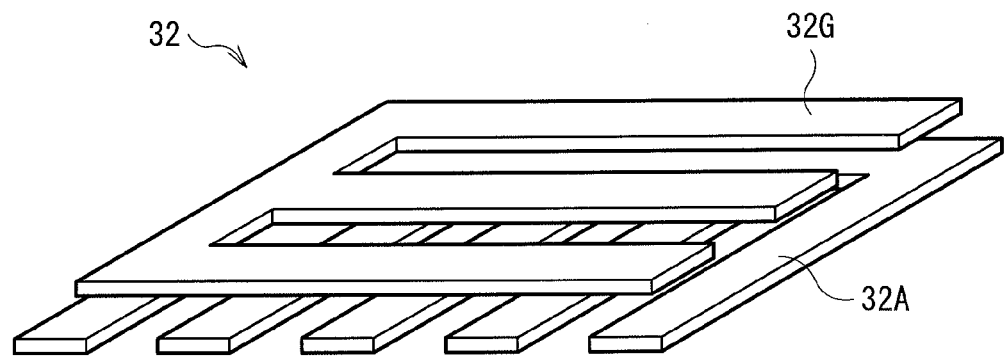
FIG. 17 is a perspective diagram showing a second modification example for configuration of the electrode illustrated in FIG. 1.
Figure 18:
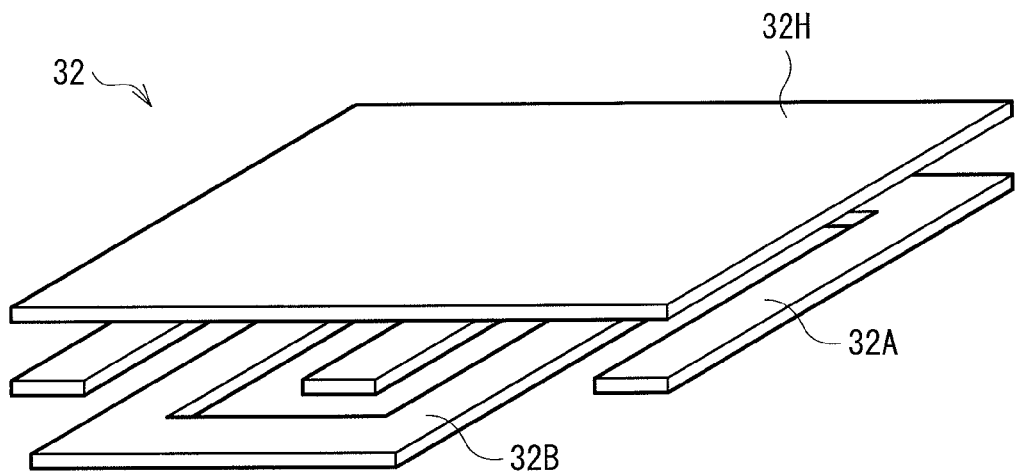
FIG. 18 is a perspective diagram showing a third modification example for configuration of the electrode illustrated in FIG. 1.
Figure 19:
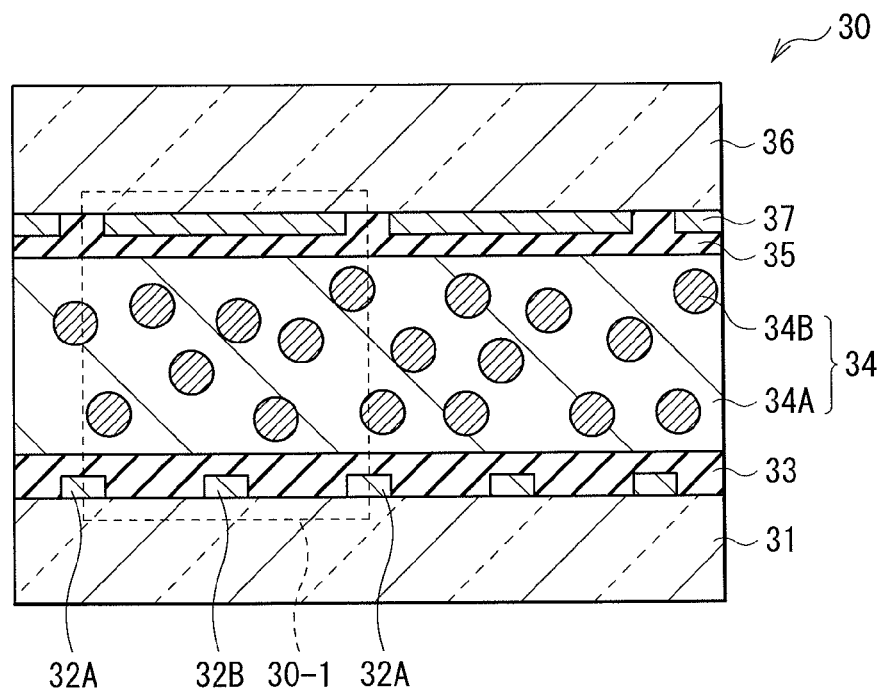
FIG. 19 is a cross-sectional diagram showing another modification example for configuration of the light modulation device illustrated in FIG. 1.

When the light source 60 is provided for the display unit 1, as shown in FIGS. 16 to 18, it is preferable to arrange an electrode layout for the electrode 32 wherein a main electric field generated within each light modulation cell 30-1 intersects with a normal line of the transparent substrate 31, and is not parallel to the top surface of the transparent substrate 31.

In such a case, it is possible to efficiently scatter, in the light modulation layer 34, both of the outside light incoming from the top surface and the light from the light source 60 that is incident from a transverse direction. As a result, for example, it is possible to display images only using outside light at a bright time during the day, and display images by turning on the light source 20 to compensate for shortage of the amount of light when outside light deteriorates in intensity in a room or at night.

Here, when a front light is provided on a reflection-type display unit 1 to assure the visibility even in a dark state with a small amount of outside light, thickness of the front light may often give the impression of depth on a displayed image. Further, in a bright state with a large amount of outside light, provision of the front light may often increase reflected light due to an interface, surface shape, and pattern of the front light, leading to deterioration in the contrast. On the contrary, a method for combining the light guide plate 50 with the light modulation device 30 as shown in FIG. 14(A) eliminates degradation in the visibility due to the impression of depth or deterioration in the contrast due to unwanted reflected light. In this case, therefore, it is possible to achieve a display with high contrast. Further, a method for combining the light guide plate 50 with the light modulation device 30 as shown in FIGS. 14(B) and (C) allows the impression of depth for a displayed image to be reduced as compared with a case where the front light is provided. It is to be noted that, in FIGS. 14(A) to (C), the light-absorbing plate 20 may be omitted as appropriate as a matter of course.

Second Modification Example

Figure 15:
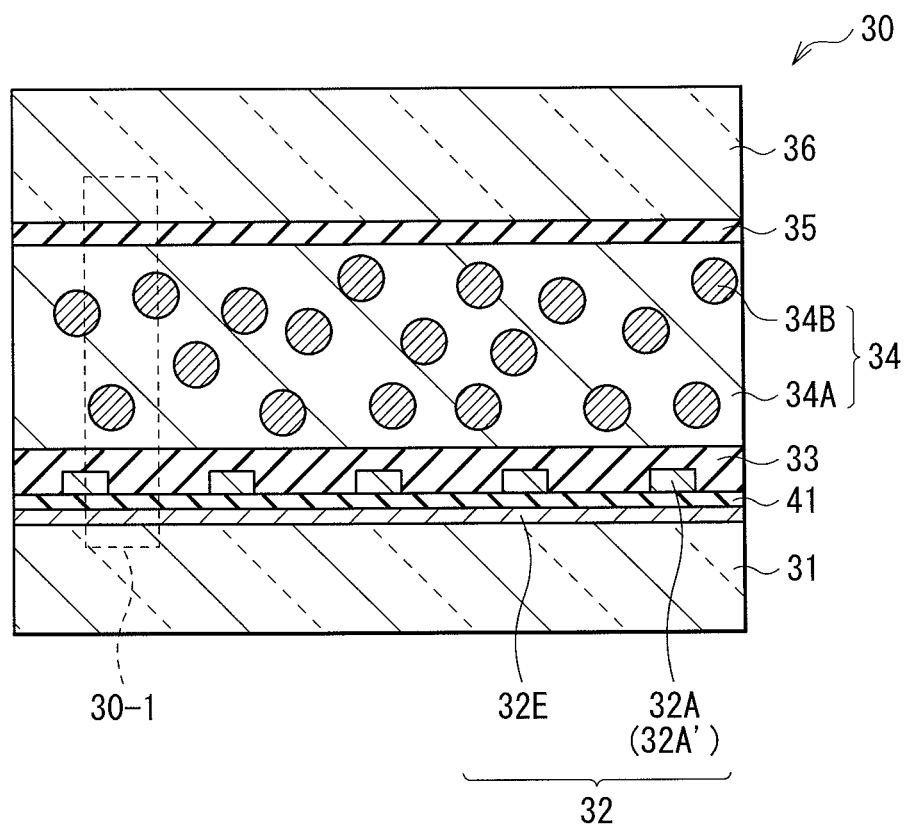
FIG. 15 is a cross-sectional diagram showing a modification example for configuration of the light modulation device illustrated in FIG. 1.

Further, in the above-described embodiment and modification example thereof, the electrode 32 is provided within the same layer, although a part of the electrode 32 may be provided within a layer different from the rest of the electrode 32. As shown in FIG. 15 for example, a third electrode 32E that constitutes a part of the electrode 32 may be provided between the transparent substrate 31 and a newly provided insulating film 41, the first electrode 32A (or the partial electrode 32A') may be provided at the top surface of the insulating film 41, and further the alignment film 33 may be provided at the top surface of the insulating film 41 including the first electrode 32A (or the partial electrode 32A'). At this time, the third electrode 32E is in a piece of sheet-like form (film formed over a whole area of the top surface) as shown in FIG. 15 for example. This allows the electrode 32 to mainly generate an electric field in a transverse direction within the light modulation layer 34 using a potential difference between the first electrode 32A (or the partial electrode 32A') and the third electrode 32E.

Further, in the above-described embodiment and modification example thereof, the electrode 32 is provided only at the transparent substrate 31 side, although this may be provided, for example, at the top surface of the transparent substrate 36 as described in a third modification example to fifth modification example.

Third Modification Example

As shown in FIG. 16 for example, the second electrode 32B is omitted, and a fourth electrode 32F is provided at the top surface of the light modulation layer 34 side on the transparent substrate 36. The fourth electrode 32F has a plurality of strip-shaped electrodes extending toward one in-plane direction parallel to the top surface of the transparent substrate 31 (or transparent substrate 36). The strip-shaped electrodes on the fourth electrode 32F and the strip-shaped electrodes on the first electrode 32A are, for example, parallel to each other, or almost parallel to each other. Further, the strip-shaped electrodes on the fourth electrode 32F are disposed at a position that is not in opposite to the strip-shaped electrodes on the first electrode 32A. The strip-shaped electrodes on the fourth electrode 32F are electrically connected with each other. The fourth electrode 32F may be composed of a single structure as shown in FIG. 16 for example, although may be composed of a plurality of structures.

The fourth electrode 32F is composed of, for example, a transparent conductive material such as Indium Tin Oxide (ITO). When the first electrode 32A and the fourth electrode 32F are composed of a plurality of partial electrodes respectively, one or more first electrodes 32A and one or more fourth electrodes 32F constitute the light modulation cell 30-1. In this case, each light modulation cell 30-1 exhibits the transparency or the scattering property to outside light incoming from the top surface of the display panel 10 depending on a magnitude of a value of the voltage applied to the partial electrodes on the first electrode 32A and the fourth electrode 32F. At this time, a main electric field generated within each light modulation cell 30-1 intersects with a normal line of the transparent substrate 31, and is not parallel to the top surface of the transparent substrate 31. Therefore, the optical axes AX1 and AX2 of the bulk 34A and the particulates 34B within the light modulation layer 34 intersect with a normal line of the transparent substrate 31, and are not parallel to the top surface of the transparent substrate 31, and may be faced toward different directions from each other, or the same or almost the same directions with each other within a plane that intersects with a normal line of the transparent substrate 31 and is not parallel to the top surface of the transparent substrate 31 depending on a magnitude of an electric field generated by the electrode 32.

Fourth Modification Example

As shown in FIG. 17 for example, the second electrode 32B is omitted, and a fifth electrode 32G is provided at the top surface of the light modulation layer 34 side on the transparent substrate 36. The fifth electrode 32G has a plurality of strip-shaped electrodes extending toward one in-plane direction parallel to the top surface of the transparent substrate 31 (or transparent substrate 36). The strip-shaped electrodes on the fifth electrode 32G and the strip-shaped electrodes on the first electrode 32A are, for example, intersecting with each other, or orthogonal to each other. The strip-shaped electrodes on the fifth electrode 32G are electrically connected with each other. The fifth electrode 32G may be composed of a single structure as shown in FIG. 17 for example, although may be composed of a plurality of structures.

The fifth electrode 32G is composed of, for example, a transparent conductive material such as Indium Tin Oxide (ITO). When the first electrode 32A and the fifth electrode 32G are composed of a plurality of partial electrodes respectively, one or more first electrodes 32A and one or more fifth electrodes 32G constitute the light modulation cell 30-1. In this case, each light modulation cell 30-1 exhibits the transparency or the scattering property to outside light incoming from the top surface of the display panel 10 depending on a magnitude of a value of the voltage applied to the partial electrodes on the first electrode 32A and the fifth electrode 32G. At this time, a main electric field generated within each light modulation cell 30-1 intersects with a normal line of the transparent substrate 31, and is not parallel to the top surface of the transparent substrate 31. Therefore, the optical axes AX1 and AX2 of the bulk 34A and the particulates 34B within the light modulation layer 34 intersect with a normal line of the transparent substrate 31, and are not parallel to the top surface of the transparent substrate 31, and may be faced toward different directions from each other, or the same or almost the same directions with each other within a plane that intersects with a normal line of the transparent substrate 31 and is not parallel to the top surface of the transparent substrate 31 depending on a magnitude of an electric field generated by the electrode 32.

Fifth Modification Example

As shown in FIG. 18 for example, a sixth electrode 32H may be provided at the top surface of the light modulation layer 34 side on the transparent substrate 36. The sixth electrode 32H is in a piece of sheet-like form (film formed over a whole area of the top surface).

The sixth electrode 32H is composed of, for example, a transparent conductive material such as Indium Tin Oxide (ITO). When outside light is used, the sixth electrode 32H is not used (that is, the sixth electrode 32H is put into a floating state), and only the first electrode 32A and the second electrode 32B are driven, thereby generating a main electric field in a direction parallel to the top surface of the transparent substrate 31. Further, as described hereinafter, when a light source provided within the display unit 1 is used in addition to the outside light, the first electrode 32A and the second electrode 32B are driven at the same potential, and a reference potential (for example, grounding potential) is applied to the sixth electrode 32H, thereby generating a main electric field in a direction vertical to the top surface of the transparent substrate 31 within the light modulation layer 34.

Here, when only the first electrode 32A and the second electrode 32B are driven, a main electric field generated within each light modulation cell 30-1 intersects with a normal line of the transparent substrate 31, and is not parallel to the top surface of the transparent substrate 31. Therefore, the optical axes AX1 and AX2 of the bulk 34A and the particulates 34B within the light modulation layer 34 intersect with a normal line of the transparent substrate 31, and are not parallel to the top surface of the transparent substrate 31, and may be faced toward different directions from each other, or the same or almost the same directions with each other within a plane that intersects with a normal line of the transparent substrate 31 and is not parallel to the top surface of the transparent substrate 31 depending on a magnitude of an electric field generated by the electrode 32.

Sixth Modification Example

In the above-described embodiment and modification examples thereof, the light modulation layer 34 exhibits the transparency when no voltage is applied to the electrode 32, while exhibits the scattering property when a voltage is applied to the electrode 32, although it may exhibit the scattering property when no voltage is applied to the electrode 32, while may exhibit the transparency when a voltage is applied to the electrode 32 alternatively. Even in such a case, however, the optical axes AX1 and AX2 of the bulk 34A and the particulates 34B within the light modulation layer 34 intersect with a normal line of the transparent substrate 31, and may be faced toward different directions from each other, or the same or almost the same directions with each other within a plane intersecting with a normal line of the transparent substrate 31 depending on a magnitude of an electric field generated by the electrode 32.

Seventh Modification Example

In the above-described embodiment and modification examples thereof, a color filter may be provided for the display unit 1. As shown in FIG. 20 for example, a color filter 37 may be provided between the alignment film 35 and the transparent substrate 36, as well as for each light modulation cell 30-1. At this time, for example, three adjoining color filters 37 may be composed of a red-color filter, a blue-color filter, and a green-color filter.

Eighth Modification Example

Further, in the above-described embodiment and modification examples thereof, black pigment may be added to the bulk 34A and the particulates 34B within the light modulation layer 34. An example of the black pigment includes dichromatic pigment. When no voltage is applied, the dichromatic pigment is arrayed in almost the same direction as liquid crystal molecules in the particulates 34B, and a polarized light component having a vibration direction parallel to a molecule axis of the dichromatic pigment in incident light is absorbed by the dichromatic pigment, resulting in the light modulation layer 34 being put into a light-absorbing state. On the other hand, when a voltage is applied, the liquid crystal molecules and the dichromatic pigment are arrayed in an electric field direction, resulting in the light modulation layer 34 being put into a light-scattering state. In such a method, by adding the dichromatic pigment to the bulk 34A and the particulates 34B within the light modulation layer 34, it is possible to obtain high contrast.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A reflection-type display panel with a light modulation device, the light modulation device comprising:
    a lower-side substrate and an upper-side substrate that are disposed in opposition to one another via a spacing;
    electrodes provided on a top surface of at least one substrate of the lower-side substrate and the upper-side substrate, and the electrodes are arranged so as to generate a main electric field only in a direction parallel to a first plane intersecting with a normal line of the lower-side substrate; and
    a light modulation layer provided in the spacing between the lower-side substrate and the upper-side substrate, and including a first region and a second region each having an optical anisotropy,
    wherein an optical axis of the first region and an optical axis of the second region are parallel to the first plane, and are faced in the same or substantially the same direction with each other within the first plane when no electric field is generated between the electrodes, and are faced in different directions from each other within the first plane when the electric field of a particular magnitude is generated, and
    wherein the first plane is non-parallel to a top surface of the lower-side substrate.

2. The reflection-type display panel according to claim 1, wherein the electrodes are composed of a conductive material having a light-absorbing property.

3. The reflection-type display panel according to claim 1, further comprising a light guide plate bonded to an undersurface of the light modulation device.

4. The reflection-type display panel according to claim 1, wherein the light modulation layer is configured to include a liquid crystal molecule and a polymer molecule, the liquid crystal molecule having relatively fast response speed to the electric field generated by the electrode in comparison to a response speed to the electric field generated by the electrode of the polymer molecule.

5. The reflection-type display panel according to claim 1, further comprising a light absorbing layer on a side of the light modulation device opposite to an incident light side of the light modulation device.

6. A reflection-type display unit with a display panel and a driving circuit that drives the display panel, the display panel being provided with a light modulation device, the light modulation device comprising:

a lower-side substrate and an upper-side substrate that are disposed in opposition to one another via a spacing;

electrodes provided on a top surface of at least one substrate of the lower-side substrate and the upper-side substrate, and the electrodes being arranged so as to generate a main electric field only in a direction parallel to a first plane intersecting with a normal line of the lower-side substrate; and a light modulation layer provided in the spacing between the lower-side substrate and the upper-side substrate, and including a first region and a second region each having an optical anisotropy, wherein an optical axis of the first region and an optical axis of the second region are parallel to the first plane, and are faced in the same or substantially the same direction with each other within the first plane when no electric field is generated between the electrodes, and are faced in different directions from each other within the first plane when the electric field of a particular magnitude is generated, and wherein the first plane is non-parallel to a top surface of the lower-side substrate.

7. The reflection-type display unit according to claim 6, further comprising:

a light guide plate bonded to an undersurface of the light modulation device; and a light source provided at a side surface of the light guide plate.

8. The reflection-type display panel according to claim 6, further comprising a light absorbing layer on a side of the light modulation device opposite to an incident light side of the light modulation device.

* * * * *